US006961207B2

(12) United States Patent
Kang et al.

(10) Patent No.: US 6,961,207 B2
(45) Date of Patent: Nov. 1, 2005

(54) APPARATUS AND METHOD FOR DAMPENING DISK VIBRATION IN STORAGE DEVICES

(75) Inventors: Seong Woo Kang, Santa Clara, CA (US); Seong Hoon Kim, Cupertino, CA (US); Gregory Tran, Santa Clara, CA (US); Vincent Nguyen, San Jose, CA (US); Scott Tam, San Jose, CA (US); Nikollay Ivanov, Campbell, CA (US); Joe Bragg, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 216 days.

(21) Appl. No.: 10/142,078

(22) Filed: May 8, 2002

(65) Prior Publication Data

US 2003/0072103 A1 Apr. 17, 2003

Related U.S. Application Data

(63) Continuation-in-part of application No. 10/100,960, filed on Mar. 18, 2002, now Pat. No. 6,771,458.

(60) Provisional application No. 60/290,128, filed on May 10, 2001.

(51) Int. Cl.[7] .................................................. G11B 33/14

(52) U.S. Cl. ...................................................... 360/97.02

(58) Field of Search ........................... 360/97.02, 97.01, 360/99.08; 181/207; 96/13; 369/80

(56) References Cited

U.S. PATENT DOCUMENTS

| | | | | | |
|---|---|---|---|---|---|
| 5,417,743 | A | * | 5/1995 | Dauber | 96/13 |
| 5,483,397 | A | * | 1/1996 | Gifford et al. | 360/97.01 |
| 5,537,270 | A | * | 7/1996 | Morehouse et al. | 360/97.02 |
| 5,854,725 | A | | 12/1998 | Lee | |
| 5,910,862 | A | | 6/1999 | Ogawa et al. | |
| 6,097,568 | A | | 8/2000 | Ekhoff | |
| 6,236,532 | B1 | * | 5/2001 | Yanagisawa | 360/97.02 |
| 6,239,943 | B1 | | 5/2001 | Jennings et al. | |
| 6,360,843 | B1 | * | 3/2002 | Kim et al. | 181/207 |
| 6,407,879 | B1 | * | 6/2002 | Fruge' et al. | 360/97.02 |
| 6,529,345 | B1 | * | 3/2003 | Butler et al. | 360/97.01 |
| 6,809,898 | B1 | * | 10/2004 | Prochazka | 360/99.08 |
| 2002/0135933 | A1 | * | 9/2002 | Harrison et al. | 360/97.02 |
| 2003/0117746 | A1 | * | 6/2003 | Kovinskaya et al. | 360/97.02 |
| 2003/0147175 | A1 | * | 8/2003 | Tadepalli et al. | 360/97.02 |

FOREIGN PATENT DOCUMENTS

| | | | | |
|---|---|---|---|---|
| JP | 2000065133 | A | * | 3/2000 |
| JP | 2000-322870 | | | 11/2000 |
| JP | 2000-322871 | | | 11/2000 |
| JP | 2000-331460 | | | 11/2000 |

* cited by examiner

*Primary Examiner*—Tianjie Chen

(74) *Attorney, Agent, or Firm*—Gregory Smith & Associates; Jeffrey P. Aiello; Earle Jennings

(57) ABSTRACT

Aerodynamic forces contribute to disk and actuator vibration leading to track positioning errors in storage devices such as hard disk drives. The invention provides a variety of dampening mechanisms and a method of dampening to alleviate these problems.

59 Claims, 25 Drawing Sheets

PES Level Chart

PES Level Chart

APPARATUS AND METHOD FOR DAMPENING DISK VIBRATION IN STORAGE DEVICES

CROSS REFERENCE TO RELATED APPLICATIONS

This application is a continuation-in-part of application Ser. No. 10/100,960, filed Mar. 18, 2002 now U.S. Pat. No. 6,771,458, and this application claims the benefit of U.S. Provisional Application No. 60/290,128, filed May 10, 2001.

TECHNICAL FIELD

This invention relates to dampening mechanisms in storage devices that reduce vibrations in a disk rotating in such a storage device.

BACKGROUND ART

Disk drives are an important data storage technology. Read-write heads directly communicate with a disk surface containing the data storage medium over a track on the disk surface.

FIG. 1A illustrates a typical prior art hard disk drive, which may be a high capacity disk drive 10. Disk drive 10 includes an actuator arm 30 that further includes a voice coil 32, actuator axis 40 suspension or head arms 50. A slider/head unit 60 is placed among data storage disks 12.

FIG. 1B illustrates a typical prior art high capacity disk drive 10. The actuator 20 includes actuator arm 30 with voice coil 32, actuator axis 40, head arms 50, and slider/head units 60. A spindle motor 80 is provided for rotating disk 12.

Since the 1980's, high capacity disk drives 10 have used voice coil actuators 20 to position their read-write heads over specific tracks. The heads are mounted on head sliders 60, which float a small distance off a surface 12-1 of a rotating disk 12 when the disk drive 10 is in operation. Often there is one head per head slider for a given disk surface 12-1. There are usually multiple heads in a single disk drive, but for economic reasons, usually only one voice coil actuator 20 for positioning head arms 50.

Voice coil actuators 20 are further composed of a fixed magnet actuator 20 interacting with a time varying electromagnetic field induced by voice coil 32 to provide a lever action via actuator axis 40. The lever action acts to move head arms 50 to position head slider units 60 over specific tracks. Actuator arms 30 are often considered to include voice coil 32, actuator axis 40, head arms 50, and swage mounts 70. Swage mounts mechanically couple head sliders 60 to actuator arms 50. Actuator arms 30 may have as few as a single head arm 50. A single head arm 52 may connect with two head sliders 60 and 60A (as shown in FIG. 1B).

FIG. 1C illustrates a cross sectional view of a single platter prior art disk drive 10 and FIG. 1D illustrates a cross sectional view of a double platter prior art disk drive 10.

Each disk drive 10 includes a disk base 100 and cover 110 that encloses disks 12 that are rotated by the spindle motor 80.

Read-write head positioning errors are a significant point of failure and performance degradation. Positioning errors are caused in part by disk fluttering. Disk fluttering occurs when a disk flexes, or vibrates, as it rotates. Some fluttering problems for disks are due to instabilities in the motor turning the disk. Fluttering problems of this type are usually addressed by spindle motor manufacturers.

There have been attempts to address disk flutter problems in the prior art. U.S. Pat. No. 6,239,943 B1, entitled "Squeeze film dampening for a hard disc drive" is directed to an attempt to address disk flutter problems. This patent discloses "a spindle motor . . . cause[ing] rotation of . . . a single or multiple disc or stack of disks . . . mounted in such a way that the rotating bottom or top (or both) disc surface is closely adjacent to a disc drive casting surface. The squeeze film action in the remaining air gap provides a significant dampening of the disc vibration. . . . Typical implementations use air gaps of 0.004–0.006" [inch] for 2½ inch [disk] drives and 0.006–0.010" [inch] for 3½ inch [disk] dirves" (lines 12–21, column 2). "According to the theory presented . . . , the damping provided by the squeeze film effect between the disc and base plate should not be a function of the spinning speed." (lines 53–55, column 5). "Significant reduction in the vibration of the top disc, in a two disc system, can be achieved by supplying squeeze film damping to the bottom disc alone. This is important because in a practical design, damping discs other than the bottom disc may be difficult." (line 65 column 5 to line 2 column 6).

While the inventors are respectful of U.S. Pat. No. 6,239,943, they find several shortcomings in its insights. It is well known that the combined relationship of read-write heads on actuators accessing disk surfaces of rotating disks brings operational success to a disk drive. There are significant aerodynamic forces acting upon a read-write head assembly and its actuator due to the rotational velocity of the disk(s) being accessed. These significant aerodynamic forces acting upon the actuator, the read-write head, or both, are unaccounted for in the cited patent. There are also significant gap distances that may relate to rotational velocity which are unaccounted for in the cited patent, as well as the inventors' experimental evidence indicating larger air gap providing reductions in track position error than this patent or any other prior art accounts for. There are significant insights to be gained from seeing the development of wave related phenomena in the physical system, both acoustically and mechanically, which are unaccounted for in the cited patent.

Increased recording density and increased spindle speeds are key factors to competitiveness in the disk drive industry. As recording densities and spindle speeds increase, both head positioning accuracy and head-flying stability must also increase. However, as spindle speeds increase, air flow-induced vibrations may also increase which may result in larger amplitude vibrations of the head-slider suspension causing read-write head positioning errors. Additionally, air flow-induced vibrations acting upon a rotating disk cause disk fluttering, which contributes to track positioning errors. Thus, reducing air flow-induced vibration is essential to reducing head-positioning and read-write errors.

SUMMARY OF THE INVENTION

The present invention comprises a dampening mechanism reducing aerodynamic forces acting upon at least a disk rotating in a storage device. The present invention achieves a reduction of disk fluttering and at least some forms of air flow-induced vibration around actuator arms, reducing head-positioning and read-write errors.

The rotational velocity of a disk surface of a rotating disk, or rotating disks, may affect significant aerodynamic forces in an air cavity in which the disk, or disks rotate. These aerodynamic forces may act upon a read-write head assembly, its actuator, and the rotating disk causing disk fluttering, head-positioning errors and read-write errors.

A boundary layer is defined herein as an air region near a solid surface with essentially no relative velocity with regards to that surface. This region is caused by the effect of friction between the solid surface and the air. The depth of this region is roughly proportional to the square root of the viscosity divided by the velocity of the surface.

Aerodynamic theory indicates the following: A rotating disk surface creates a rotating boundary layer of air. This boundary layer tends to rotate in parallel to the motion of the disk surface. A stationary surface, such as a base or cover, of the disk drive cavity facing the rotating disk surface also tends to generate a boundary layer. When the distance between the stationary surface and the disk surface is more than the boundary layer thickness of the rotating disk surface, a back flow is created against the direction of flow from the rotating disk surface. This back flow of air may act upon the disk surface, causing the disk to flutter, and may act upon the read-write head assembly, causing the head assembly to vibrate. This back flow of air, as well as other aerodynamic forces, may induce disk fluttering, head-positioning and read-write errors.

It is useful to view the physical system of the rotating disks in a sealed disk enclosure as forming a resonant cavity for both acoustic and mechanical vibrations. Simulations and experiments by the inventors have found the resonant or natural frequencies for such cavities to be dampened based upon providing a dampening surface near a spinning disk at greater distances than either theory or the prior art report.

The invented dampening mechanism includes a stationary dampening surface positioned adjacent to a rotating disk surface at a distance, or air gap, between the dampening surface and the disk surface. Improvements in disk fluttering are noted for air gaps at or less than the boundary layer thickness. However, the inventors have also observed significant dampening effects in experimental conditions matching the sealed interior of an operational disk drive at larger air gaps than either theory or the prior art indicate.

The reduced distance, or air gap, between the dampening surface of the dampening mechanism and rotating disk surface inhibits the creation of the back flow of air between the rotating disk surface and dampening surface. The air gap may also minimize the effects of the back flow of air and other aerodynamic forces acting upon the disk surface and the read-write head assembly, including its actuator. This reduces disk fluttering, improves head-positioning and aids the overall quality of disk drive performance.

DETAILED DESCRIPTION OF THE INVENTION

The rotational velocity of a disk surface of a rotating disk, or rotating disks, may affect significant aerodynamic forces in an air cavity in which the disk, or disks rotate. These aerodynamic forces may act upon a read-write head assembly, its actuator, and the rotating disk causing head-positioning and read-write errors and disk fluttering.

As stated in the summary, a boundary layer is an air region near a solid surface with essentially no relative velocity with regards to that surface. This region is caused by the effect of friction between the solid surface and the air. The depth of this region is roughly proportional to the square root of the viscosity divided by the velocity of the surface.

Figure 2A:
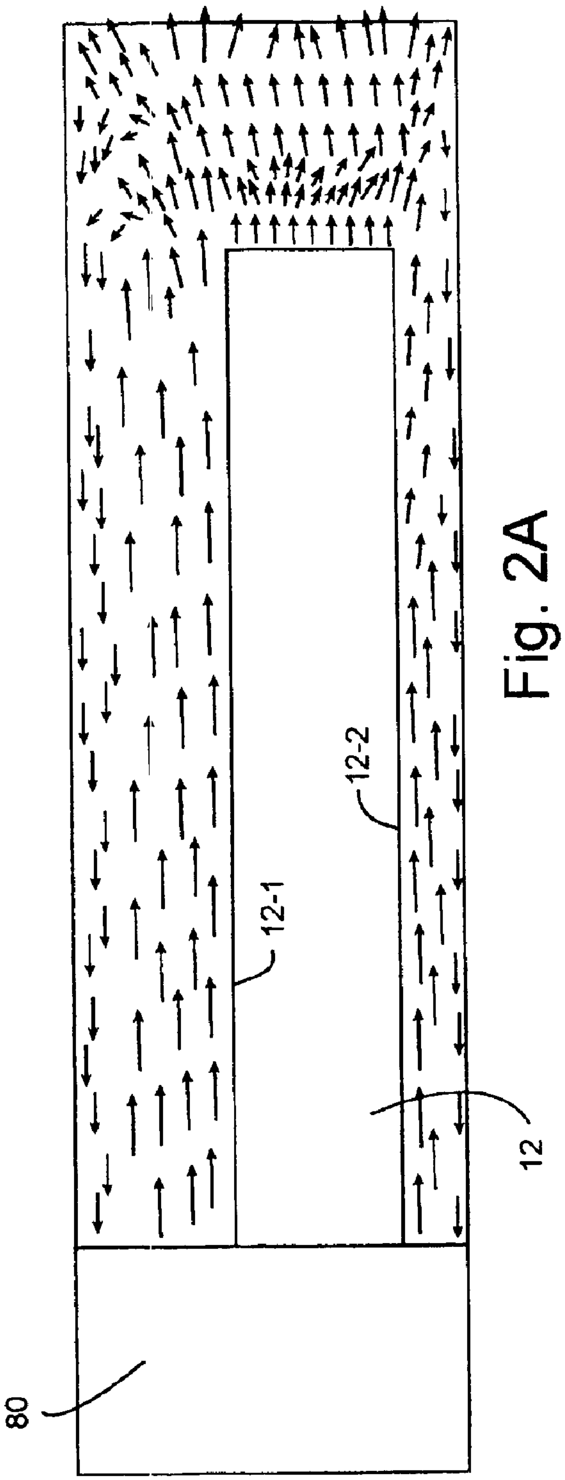
FIG. 2A illustrates a cross section view of spindle motor 80 and one disk 12 with air flow between the upper disk surface 12 and top disk cavity face, as well as air flow between the lower disk surface 12 and bottom disk cavity face.

FIG. 2A illustrates a cross section view of a spindal motor 80 and one disk 12 with air flow between the upper disk surface 12-1 and top disk cavity face, as well as air flow between the lower disk surface 12-2 and bottom disk cavity face. The disk surface is rotating at an essentially constant speed.

Theoretically, a rotating disk surface tends to create a boundary layer of air rotating in parallel to the motion of the disk surface. A stationary surface, such as a base or cover, of the disk drive cavity facing the rotating disk surface will also tend to generate a boundary layer. When the distance between the stationary surface and the disk surface is more than the boundary layer thickness of the rotating disk surface, a back flow is created against the direction of flow from the rotating disk surface. This back flow of air may act upon the disk surface, causing the disk to flutter, and may act upon the read-write head assembly, causing the head assembly to vibrate. The faster the disk rotates the greater the aerodynamic effect upon the read-write head assembly and attached actuator.

FIG. 2A may also provide insight into the tendency of such physical systems to display both acoustic and mechanical resonance. It is useful to view the physical system of the rotating disks, in the enclosure of operating hard disk drive, as forming a resonant cavity for both acoustic and mechanical vibrations. Simulations and experiments by the inventors have found the resonant or natural frequencies for such cavities to be dampened based upon providing a dampening surface near a spinning disk at greater distances than either theory or the prior art report.

Figure 1A:
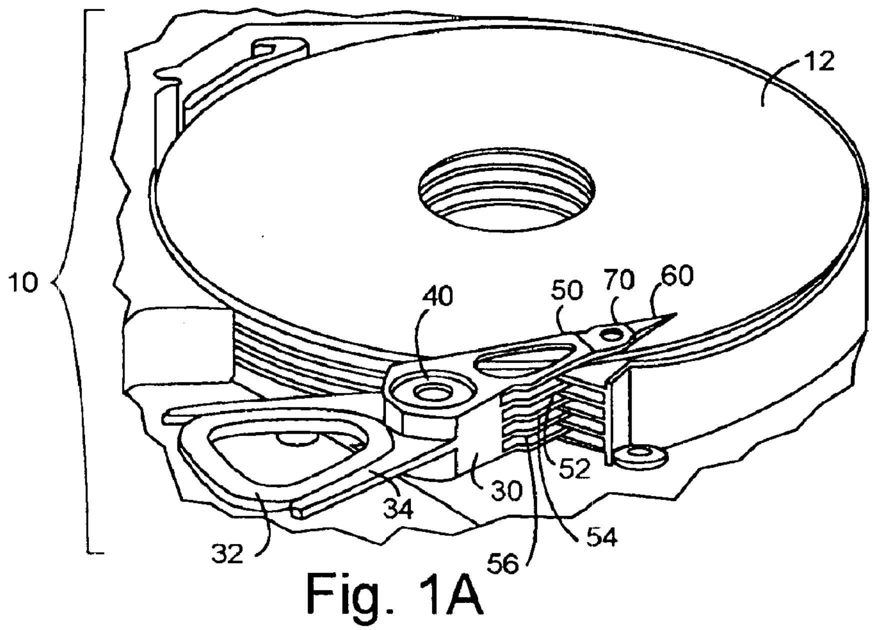
FIG. 1A illustrates a typical prior art hard disk drive, which may be a high capacity disk drive 10.
Figure 1B:
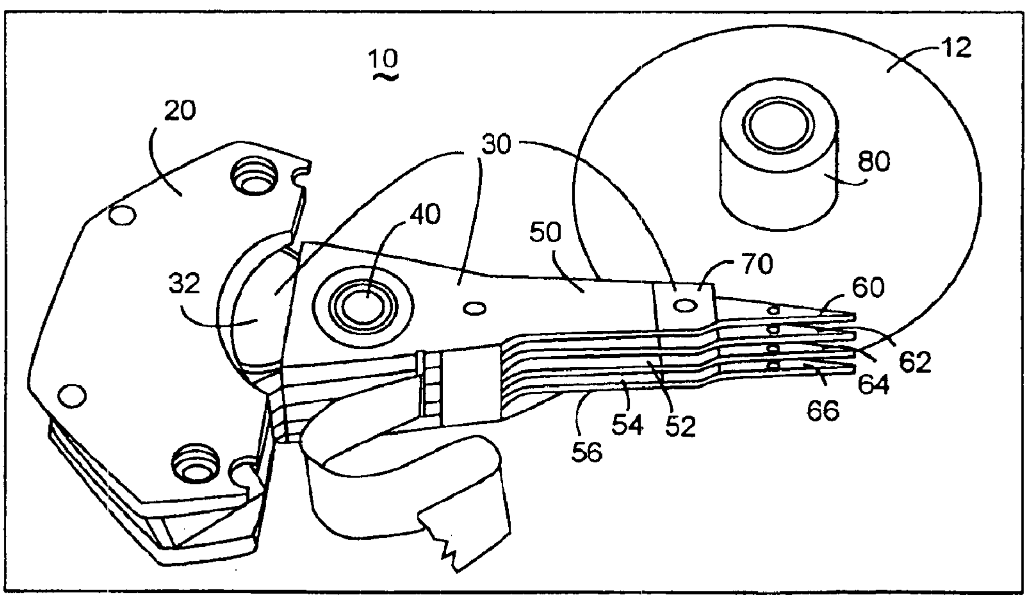
FIG. 1B illustrates a typical prior art high capacity disk drive 10.
Figure 1C:
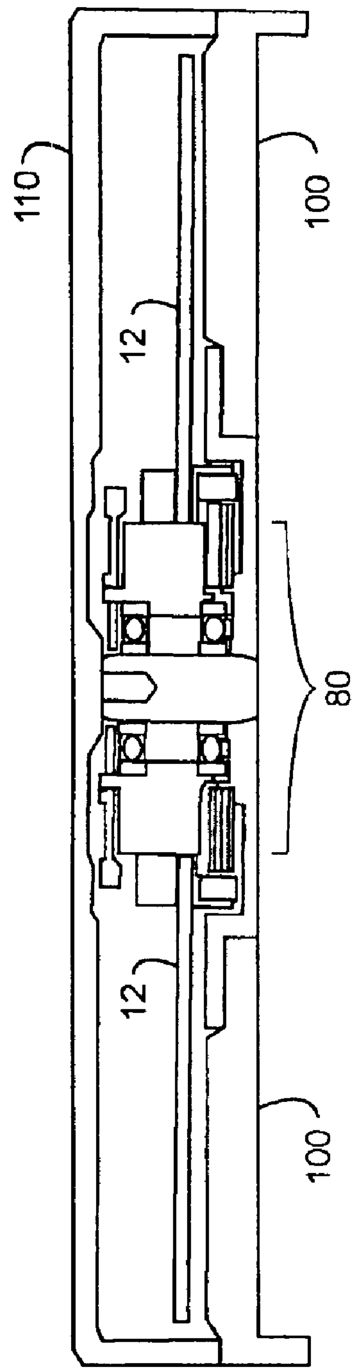
FIG. 1C illustrates a cross sectional view of a single platter prior art disk drive 10.
Figure 1D:
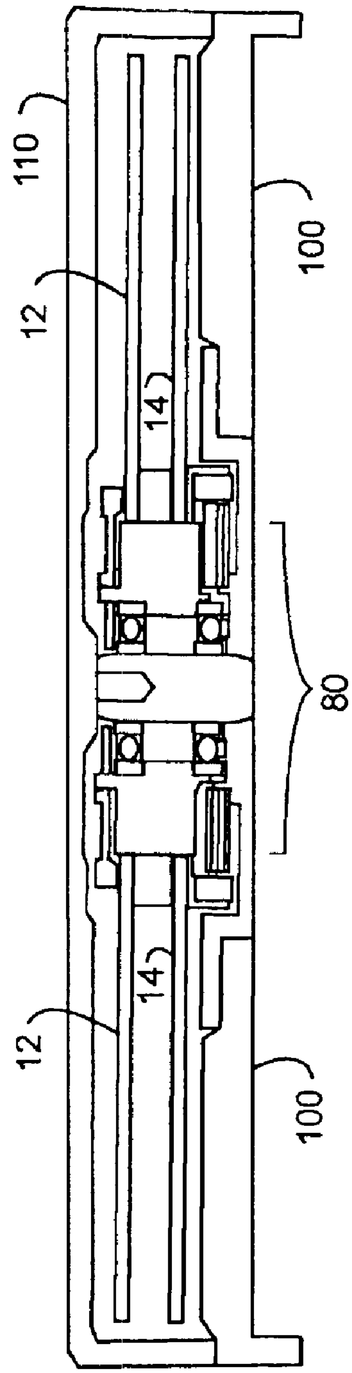
FIG. 1D illustrates a cross sectional view of a double platter prior art disk drive 10.
Figure 2B:
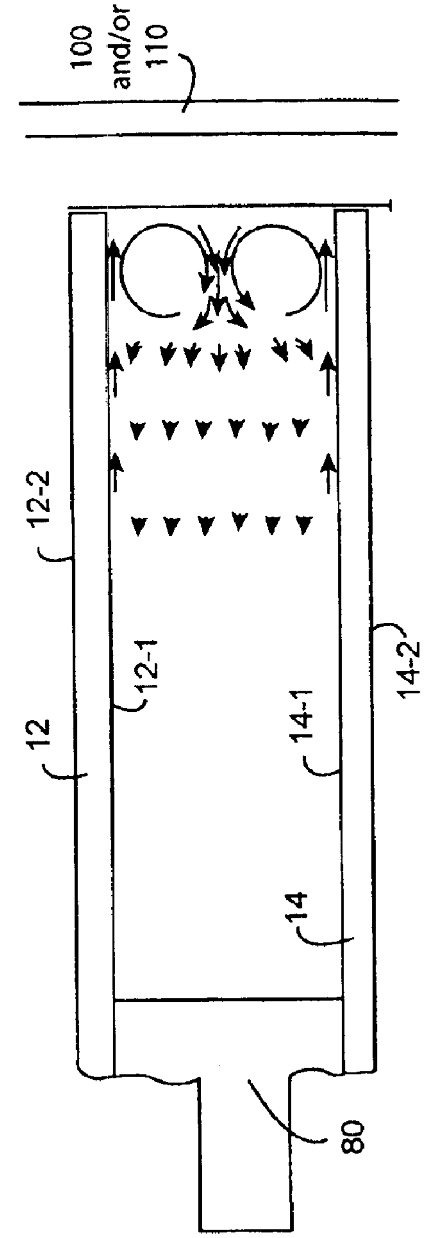
FIG. 2B illustrates a view of strong dynamic force (or pressure) near the outer-diameter region generated by the rotating air flow, leading to excitation of disk vibration.
Figure 2C:
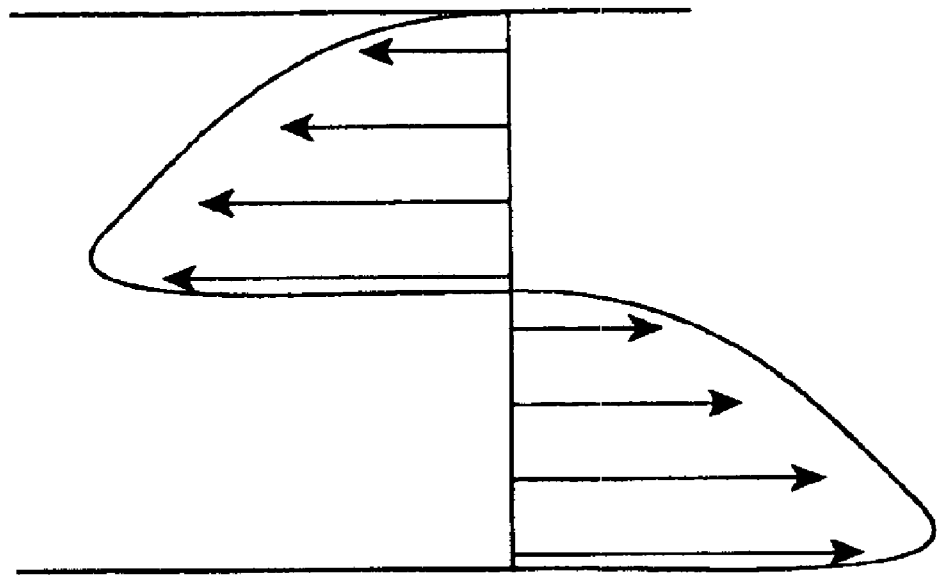
FIG. 2C illustrates the air flow situation between the upper disk surface 12 and top disk cavity face of FIG. 2A showing the formation of two separate boundary layers.
Figure 2D:
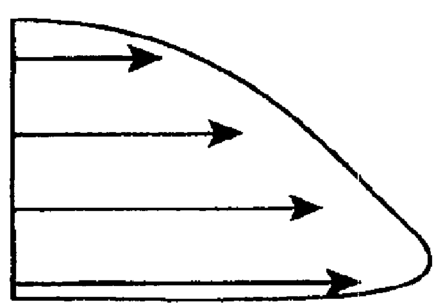
FIG. 2D illustrates the air flow situation between the lower disk surface 12 and bottom disk cavity face of FIG. 2A showing the formation of only one boundary layer.

FIG. 2B was adapted from a presentation by Professor Dae-Eun Kim entitled "Research and Development Issues in HDD Technology: Activities of CISD" at the International Symposium on HDD Dynamics and Vibration, Center for Information Storage Device (CISD), Yonsei University, Seoul, Korea on Nov. 9, 2001, and illustrates a view of strong dynamic force (or pressure) near the outer-diameter region generated by the rotating air flow, leading to excitation of disk vibration. The air flow near the outer diameter, between disks 12 and 14 experiences unsteady periodic vortices, causing resonant harmonic mechanical vibrations, fluttering the disks 12 and/or 14. Additionally, near the enclosure region formed by the disk base 100 and/or cover 110 (best seen in FIGS. 1C and 1D), a region of strong, turbulent air forms. FIGS. 2C and 2D discuss this phenomena further.

FIG. 2C illustrates the typical air flow between a disk surface and a non rotating surface showing the formation of two separate boundary layers.

In a conventional hard disk drive, the flow pattern has secondary flows, radially outward near the disk and inward at the housing, which dominate the air flow. The air flows are connected by axial flows near the periphery and near the axle. When the gap between disk and a stationary surface is larger than that of the boundary layer thickness, a significant quantity of air in the interior region is essentially isolated from the main flow. The isolated air rotates approximately as a rigid body at one-half the angular velocity of the disk. These flow characteristics make a large vortex and accelerate the disk-tilting effect, which results in a severe Position Error Signal (PES) problem.

In situations involving radial surface motion, the boundary layer is often formulated as proportional to the square root of the viscosity divided by radial velocity in radians per sec. Table 1 shows boundary layer thickness to Revolutions Per Minute (RPM).

TABLE 1

| RPM | Boundary Layer Thickness (mm) |
|---|---|
| 5400 | 0.7 |
| 7200 | 0.55 |
| 10,000 | 0.45 |

FIG. 2C tends to indicate the existence of a large vortex over the area of the top disk of a disk stack, which may have just one disk. This vortex provides a mechanical force acting to excite disk fluttering. Near the rotating disk surface, toward its rim, air flow velocities nearing 10 meters (m) per second (sec) have been found in simulations. At the edge of the boundary layer, about one boundary layer thickness from the disk surface, air velocity is about 0. Further from the disk surface, a back flow forms due to the friction with the stationary surface.

Removing the vortex adjacent the disk surface has been found to improve mechanical stability. By making the gap too narrow for secondary flows to exist, as illustrated in FIG. 2D, the air adopts a Couette flow pattern with a nearly straight-line, tangential velocity profile between the housing and the disk.

Accordingly, in one embodiment of the invention, a dampening mechanism is positioned adjacent to the surface of a rotating disk to significantly reduce the distance between a stationary surface and the rotating disk surface. This reduced distance, or air gap, between the dampening mechanism and the disk surface may be approximately the boundary layer thickness of the rotating disk. Alternatively, the air gap may be less than the approximate boundary layer thickness.

The reduced distance, or air gap, between the dampening mechanism and rotating disk surface may inhibit the creation of the back flow of air between the rotating disk surface and stationary surface. The air gap may also minimize the effects of the back flow of air and other aerodynamic forces acting upon the disk surface and the read-write head assembly, including its actuator. This may reduce disk fluttering and may improve head-positioning. When the air gap is a smaller fraction of the boundary layer thickness, there may be further improved in head positioning and reduced disk fluttering.

Figure 3:
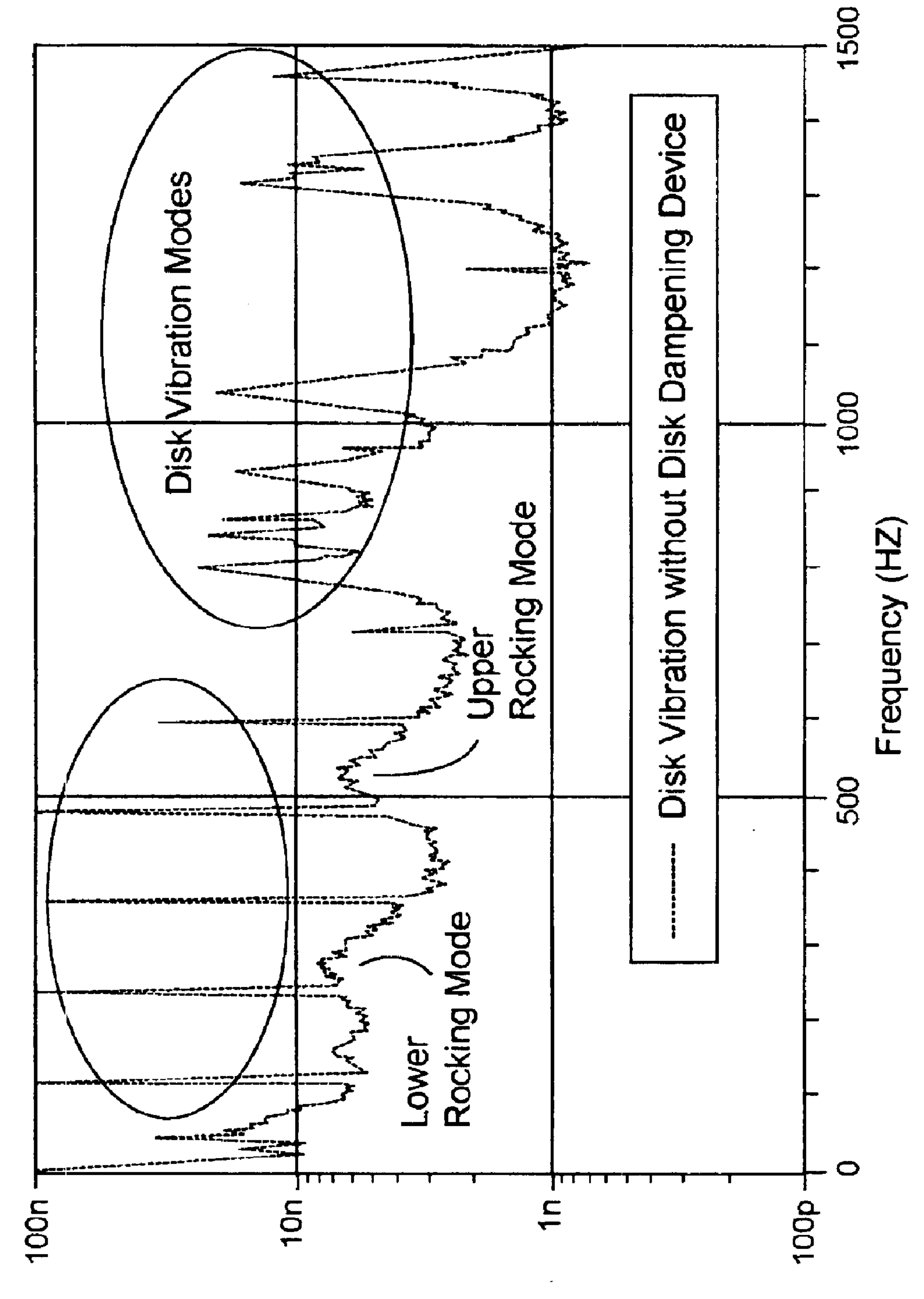
FIG. 3 illustrates disk vibration harmonics of rotation speed of a 3.5 inch conventional two platter disk drive 10 operating at 7200 revolutions per minute rotational velocity.

FIG. 3 graph showing disk vibration as harmonics of a rotation speed of a 3.5 inch conventional two platter disk drive (configured as seen in FIGS. 1D and 2B) operating at 7200 revolution per minute rotational velocity, wherein the disks 12 and 14 are 1.27 mm thick aluminum disks driven by a fluid-dynamic bearing motor 80. The measurements are of axial disk vibration at the outside diameter of the top disk as measured by a laser Doppler velocity meter. The vertical axis indicates displacement of the outside diameter as measured in meters on a logarithmic scale from 100 pico-meters to 100 nano-meters. The peaks circled on the left represent Harmonics of a rotation speed, while the peaks circled on the right represent disk vibration modes.

Figure 4:
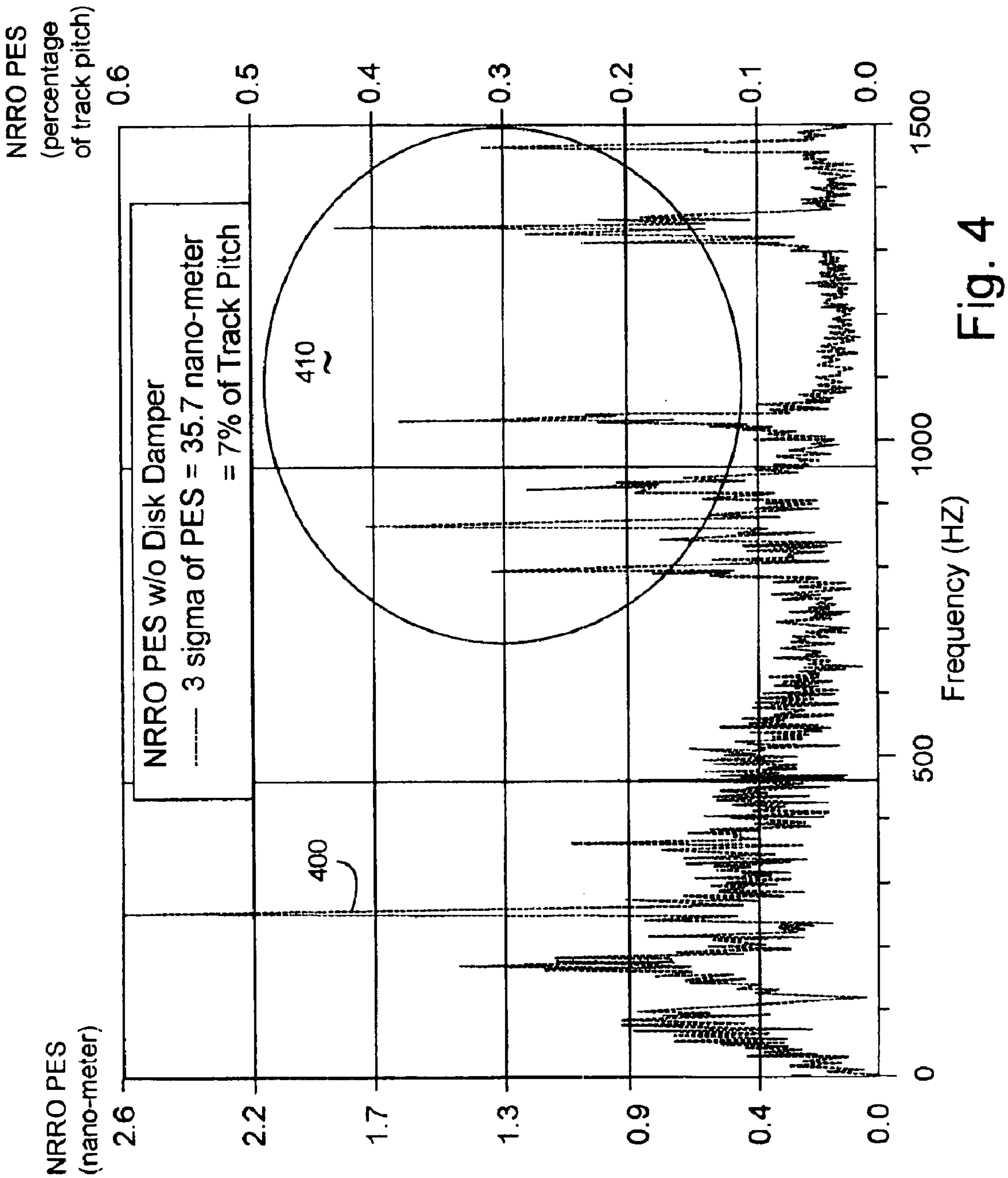
FIG. 4 illustrates a head Position Error Signal (PES) spectrum experimentally determined as a Non-Repeatable Run Out (NRRO) PES spectrum in a conventional 57,000 Track-Per-Inch (TPI) disk drive system as disclosed in the prior art.

FIG. 4 is a graph showing a head Position Error Signal (PES) spectrum experimentally determined as a Non-Repeatable Run Out (NRRO) PES spectrum in a conventional 57,000 Track-Per-Inch (TPI) disk drive system as disclosed in the prior art. The left axis indicates NRRO PES in nano-meters, and the right axis equivalently indicates NRRO PES in percentage of track pitch. The trace indicates the readings within three standard deviations for PES, which is roughly 35.7 nano-meter or seven percent of the track pitch. The PES peak 400 is caused by flow-vortex induced effects. The PES peaks within region 410 are induced by disk vibration.

Both FIGS. 3 and 4 indicate resonant or standing wave phenomena. The resonant frequencies of the disk vibration modes of FIG. 3 have a high correlation to the PES peaks within region 402 of FIG. 4.

Figure 5:
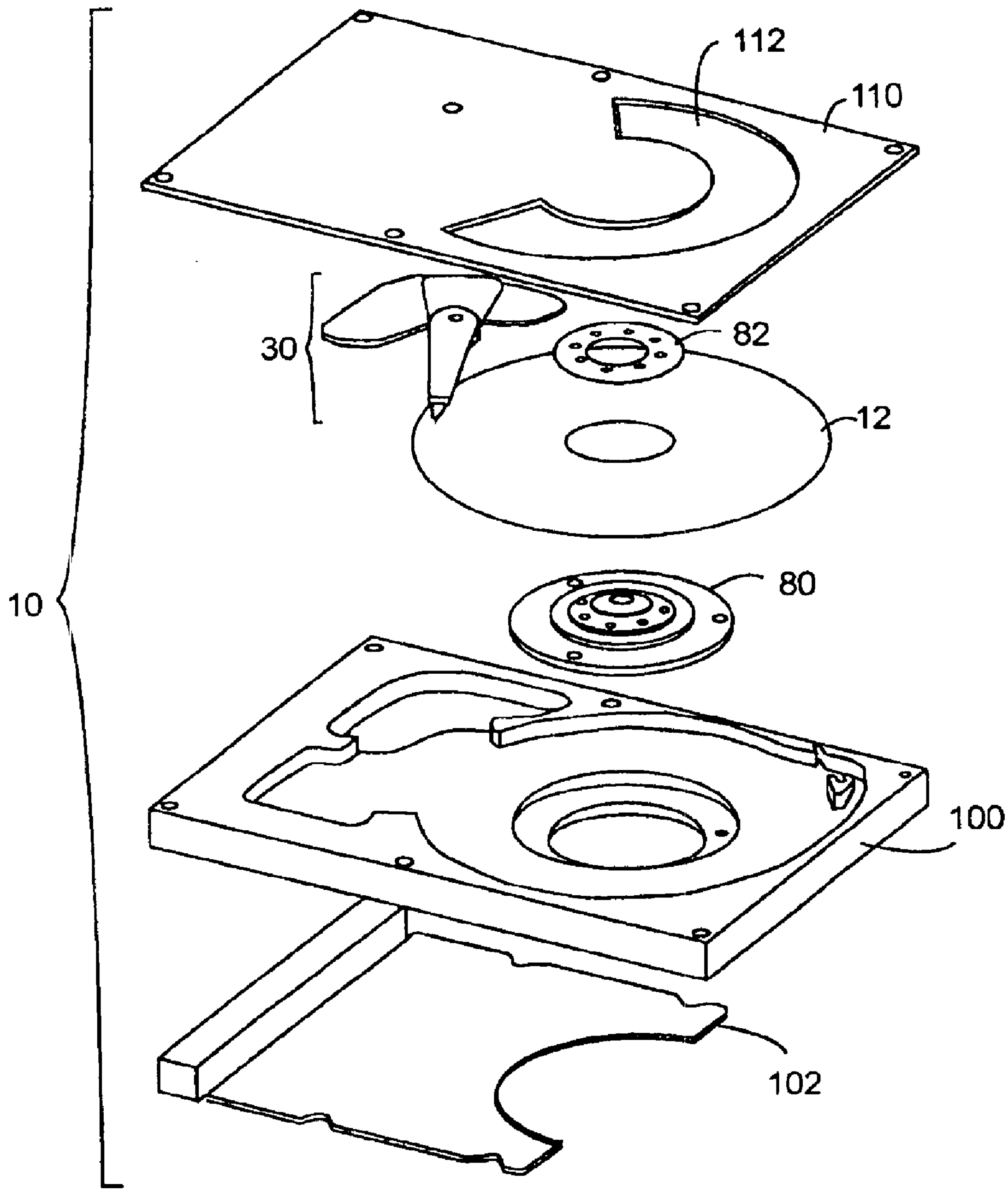
FIG. 5 illustrates an exploded schematic view of a thin disk drive 10 using a single head and supporting various aspects of the invention.

FIG. 5 illustrates an exploded schematic view of a typical thin disk drive using a single head and supporting various aspects of the invention. A thin disk drive may be preferred in applications such as multi-media entertainment centers and set-top boxes. The thin disk drive may preferably use only a single head, allowing further reduction in the gap between surfaces if base 100 and a surface of disk 12. Using a single head in the disk drive may reduce manufacturing costs and increases manufacturing reliability.

In the typical configuration shown in FIG. 5, drive 10 includes a printed circuit board assembly 102, a disk drive base 100, a spindle motor 80, a disk 12, a voice coil actuator 30, a disk clamp 82 and a disk drive cover 110. Voice coil actuator may further include a single read-write head on a head/slider 60, and Disk drive cover 110 may further include at least one region 112 providing a top stationary surface close to an upper surface of disk 12.

Figure 6:
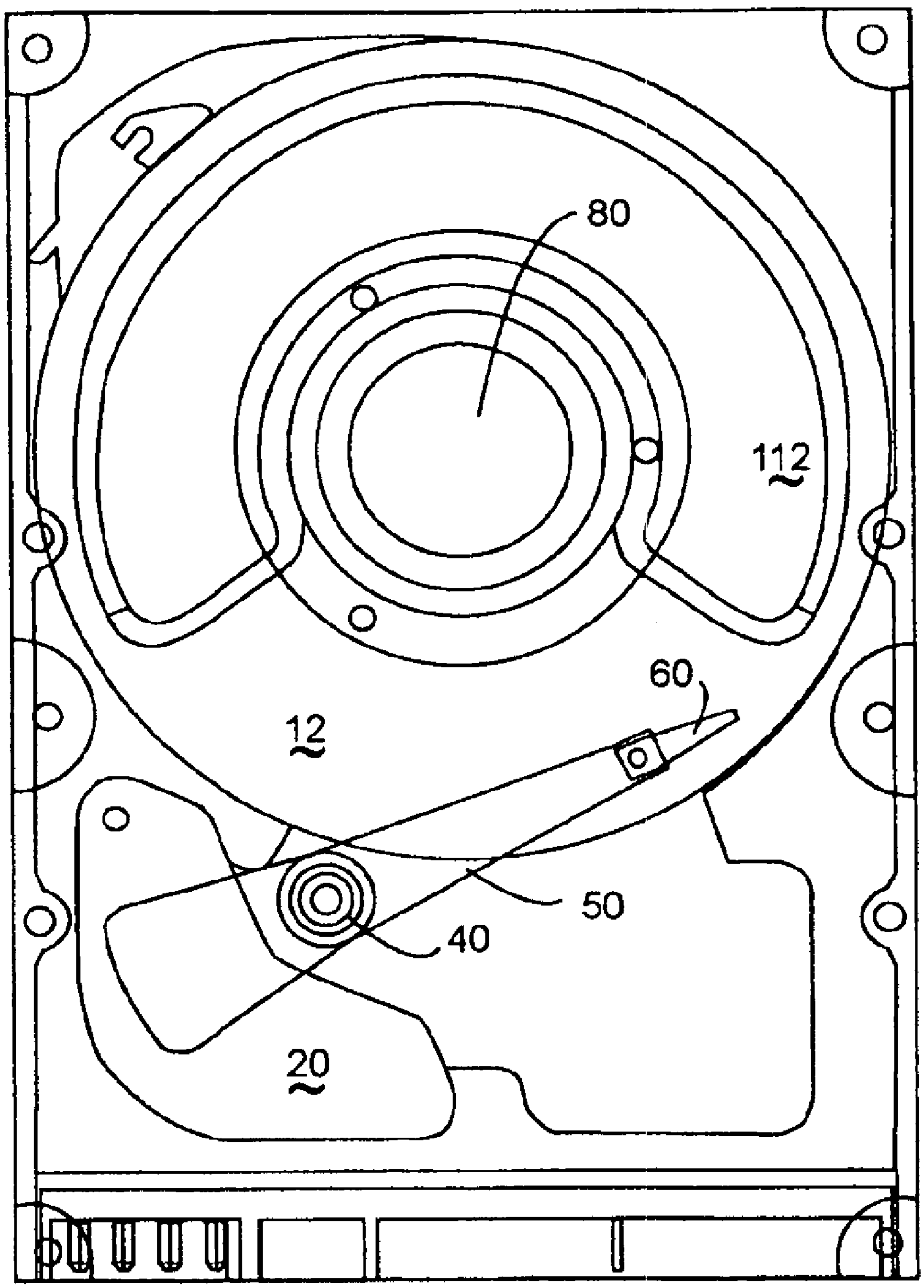
FIG. 6 illustrates a top schematic view of the thin disk drive 10 using the single head as illustrated in FIG. 5.

FIG. 6 illustrates a top schematic view of the thin disk drive of FIG. 5.

Note that region 112 may be essentially outside the region traveled by the actuator arm(s) 50 and head sliders 60 of voice coil actuator 30 when assembled and in normal operation. Region 112 may provide a connected surface, without breaks. Region 112 may further provide a simply connected surface, lacking any perforations or holes.

Figure 7:
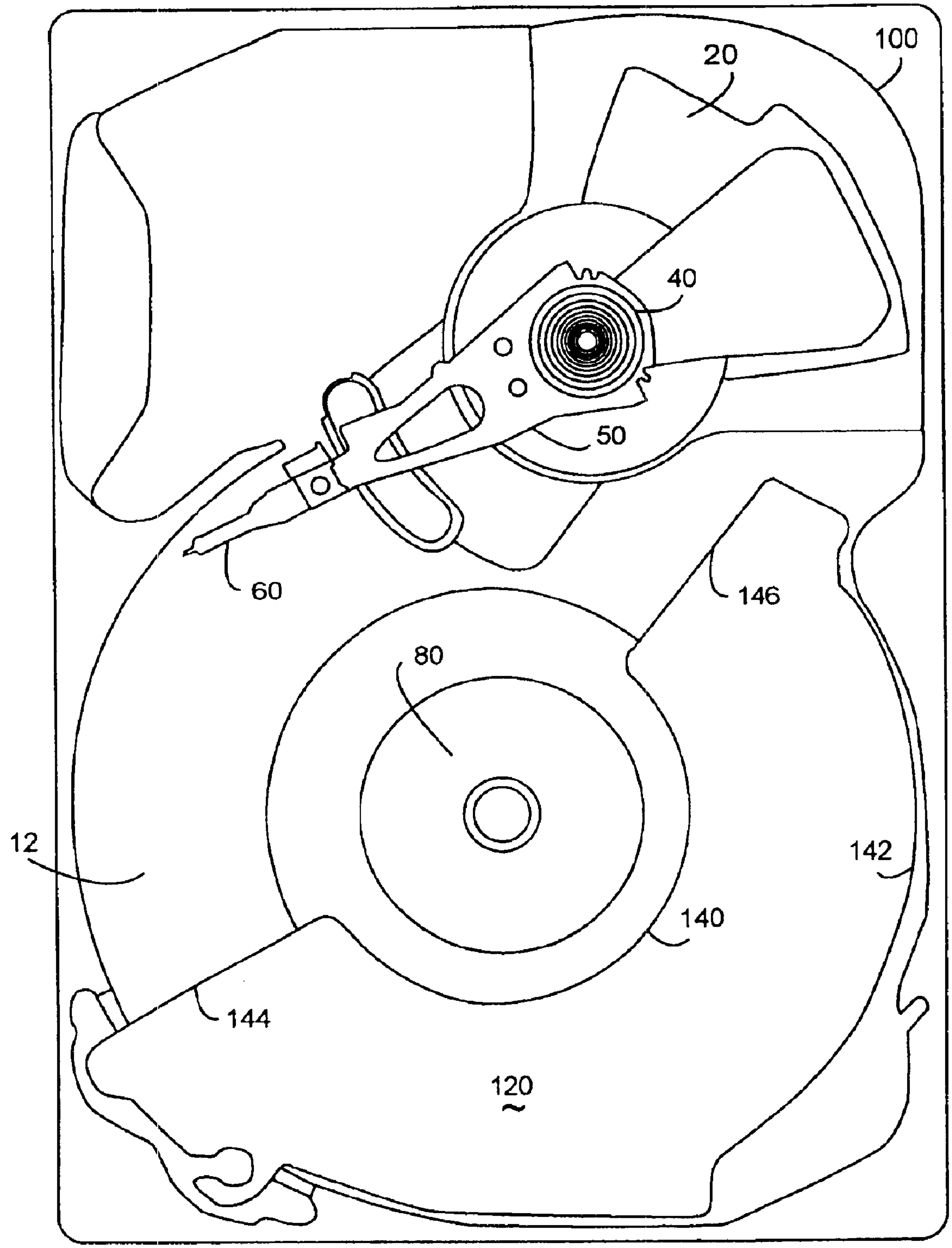
FIG. 7 illustrates a top schematic view of disk drive 10 employing a dampening mechanism 120 in accordance with certain aspects of the invention providing over 180 degrees of radial coverage where the dampening surface (not shown) is within a first gap of the first disk surface of disk 12.

FIG. 7 illustrates a top schematic view of disk drive 10 employing a dampening mechanism 120 in accordance with certain aspects of the invention providing over 180 degrees of radial coverage where the dampening surface (not shown) is within a first gap of the first disk surface of disk 12.

Figure 8:
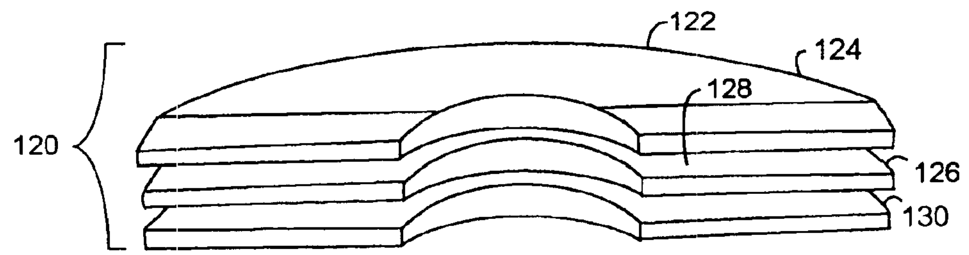
FIG. 8 illustrates a perspective view of certain preferred embodiments of dampening mechanism 120 comprised of at least one plate providing at least a first surface 122, which, when assembled in disk drive 10, provides a first gap near a first disk surface of rotating disk 12, as further seen in FIGS. 11A–12A.

FIG. 8 illustrates a perspective view of certain preferred embodiments of dampening mechanism 120 comprised of at least one plate providing at least a first surface 122, which, when assembled in disk drive 10, provides a first gap near a first disk surface of rotating disk 12, as further seen in FIGS. 11A–12A. Note that various embodiments of the invention may provide more than one dampening surface to other disk surfaces, which may or may not belong to other disks.

Figure 9:
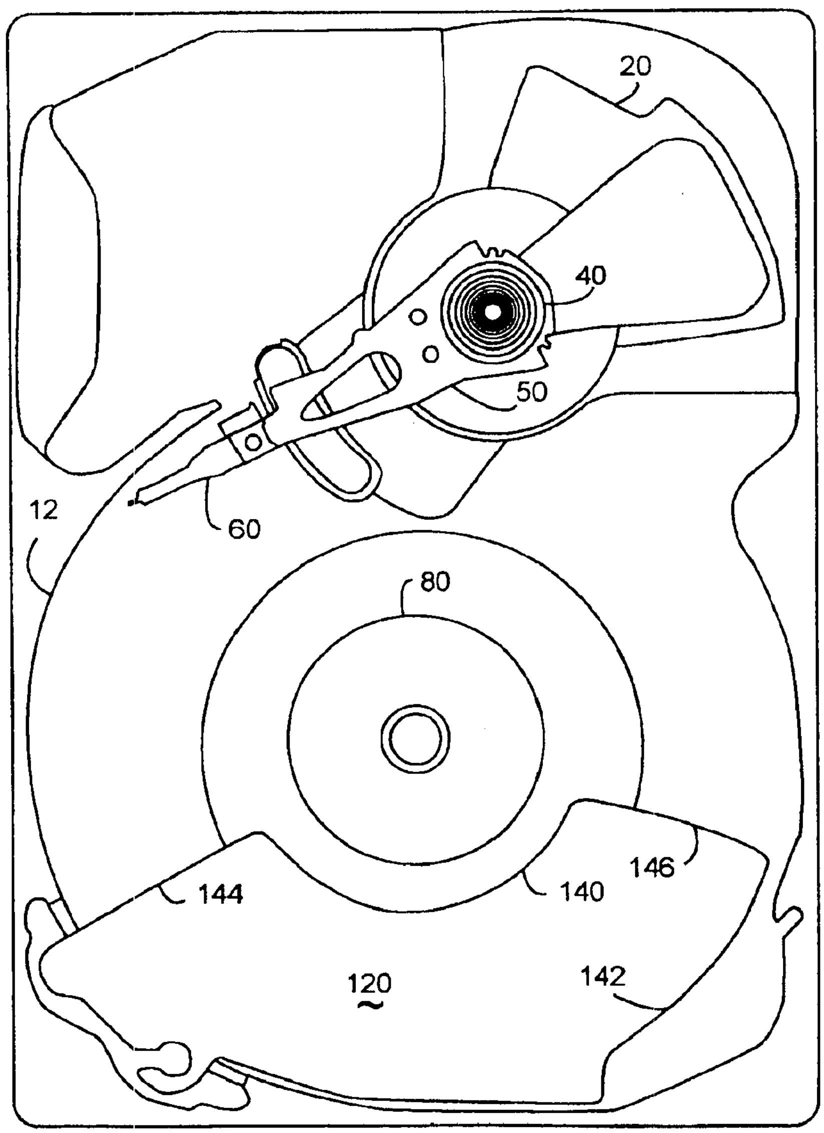
FIG. 9 illustrates a top schematic view of disk drive 10 employing an alternative embodiment dampening mechanism 120 of FIG. 7 providing less than 180 degrees of radial coverage where the dampening surface (not shown) is within a first gap of the first disk surface of disk 12.

FIG. 9 illustrates a top schematic view of disk drive employing an alternative embodiment dampening mechanism 120 providing less than 180 degrees of radial coverage where the dampening surface (note shown) is within a first gap of a surface of disk 12.

In some embodiments the dampening surfaces may form one or more plates. The dampening surfaces indicated in FIGS. 7 and 9 may each preferably form essentially a truncated annulus or "C" shape, comprising an inner boundary 140 and an output boundary 142 facing toward and away from the spindle motor, respectively. Dampening surfaces may further include first 144 and second 146 non-radial boundaries. Various preferred plates are illustrated in FIGS. 23A–23E. The inner boundary 140 may include the first non-raidal boundary 144, varying from a circular inner boundary. The outer boundary 142 may preferably include shapes for attaching to the disk plate, which vary from a circular outer boundary.

Dampening mechanism 120 is also referred to herein as a disk damper, a disk damping device, a dampening means, and an airflow stabilizer. Dampening mechanism 120 may further include a shroud or wall arranged away from the axis of rotation, in certain preferred cases to be further discussed in FIG. 22, rigidly attached to at least one of the plates shown in FIG. 8.

Figure 10A:
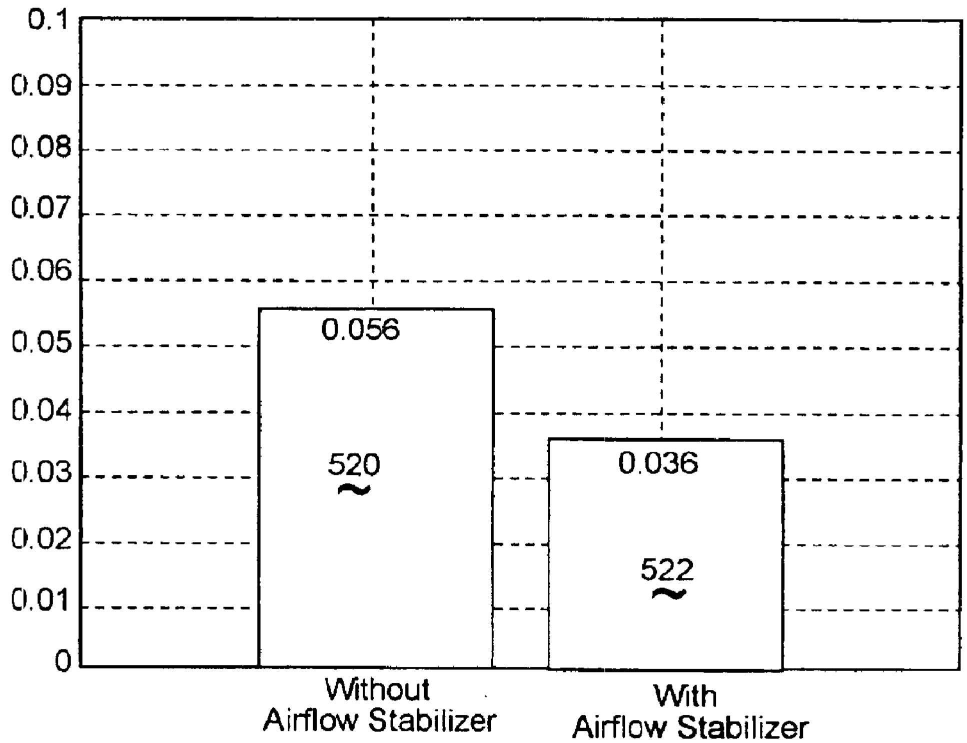
FIGS. 10A and 10B illustrate experimental results regarding track position errors obtained from an offline servo track write setup using an airflow stabilizer similar to the dampening mechanism 120 illustrated in FIGS. 8 and 9.
Figure 10B:
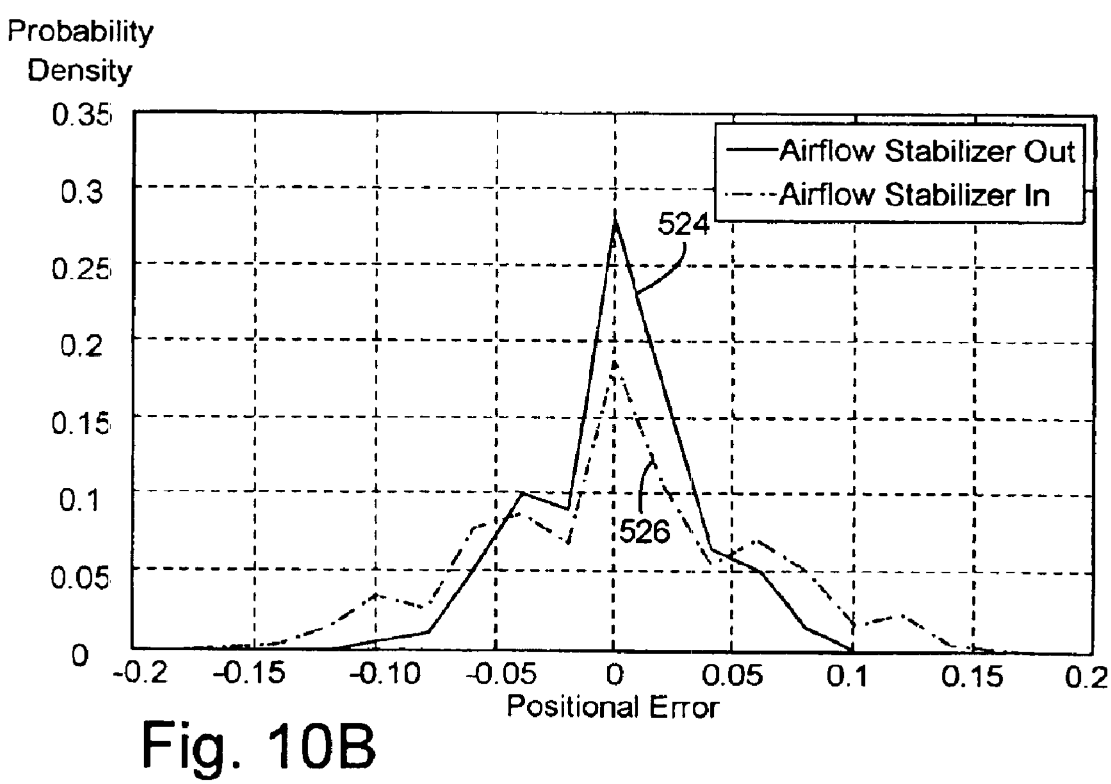

FIGS. 10A and 10B show experimental results regarding track position errors obtained from an offline servo track write setup using an airflow stabilizer similar to the dampening mechanism 120 illustrated in FIGS. 8 and 9.

The vertical axis of FIG. 10A indicates track position root mean square errors in micro-inches. Box 520 indicates the experimental track position error results without dampening mechanism 120, indicating 0.056 micro-inches root mean square errors. Box 522 indicates the experimental track position error results using dampening mechanism 120, indicating 0.036 micro-inches root mean square errors.

The vertical axis of FIG. 10B indicates the probability density per micro-inch. The horizontal axis indicates track position errors in micro-inches. Trace 524 indicates the probability density at various positional errors without the use of dampening mechanism 120. Trace 526 indicates the probability density at various positional errors with the use of dampening mechanism 120.

Figures 11A, 11B, 11C:
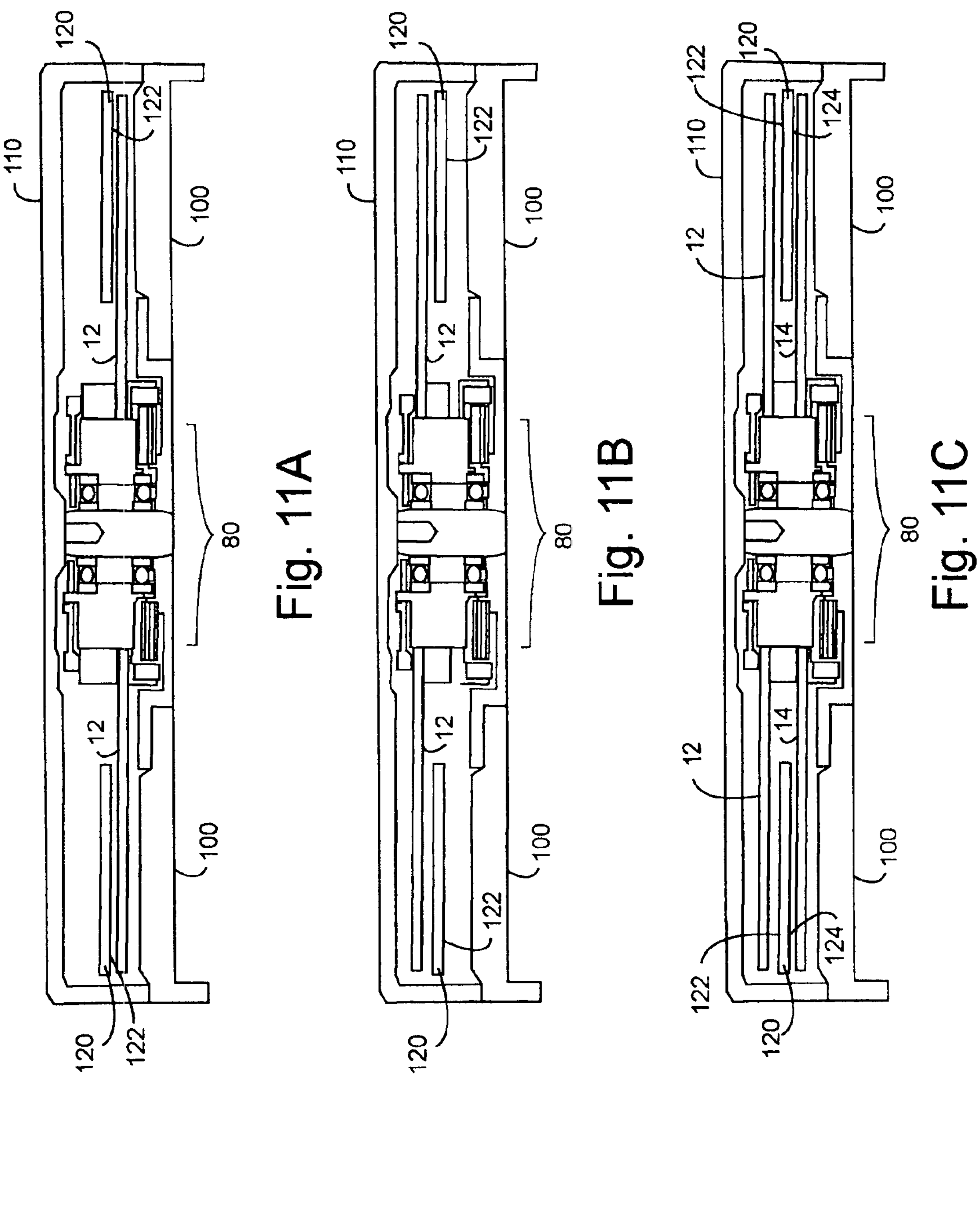
FIGS. 11A and 11B illustrate cross section views of two alternative preferred embodiments of a single platter 12 disk drive 10 of the invention.
FIG. 11C illustrates a cross section view of a preferred embodiment of a double platter 12 and 14 disk drive 10 of the invention.

FIGS. 11A and 11B illustrate cross section views of two alternative embodiments of a single platter 12 disk drive 10 of the invention.

FIG. 11C illustrates a cross section view of an embodiment of a double platter 12 and 14 disk drive 10 of the invention.

FIGS. 11A–11C illustrate dampening mechanism 120 may include a plate providing at least one dampening surface 122 close to a first disk 12 at essentially a first gap. FIG. 11C illustrates dampening mechanism 120 further providing a second dampening surface 124 close to a second disk 14 at essentially a second gap.

Figure 12A:
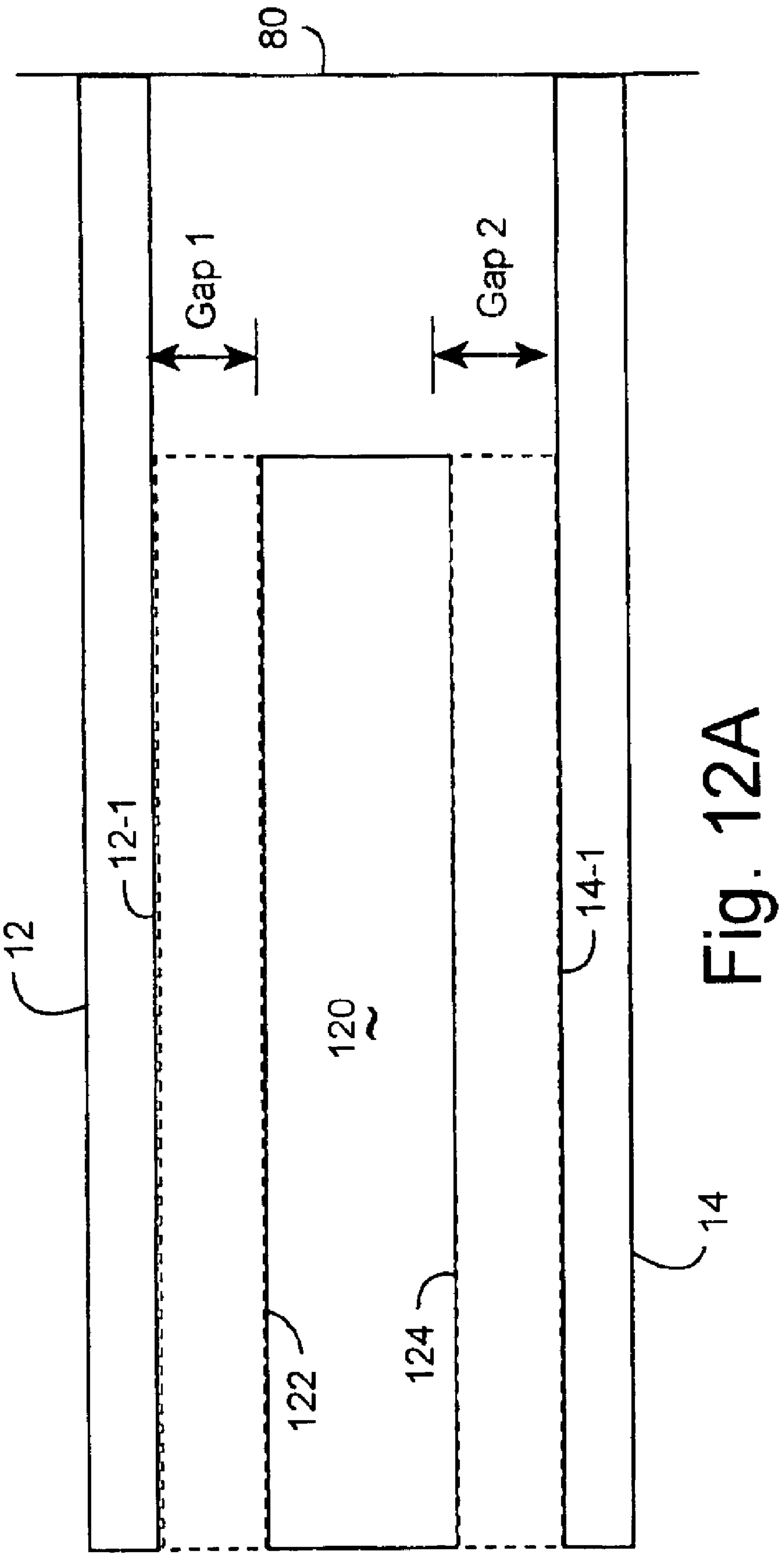
FIG. 12A illustrates a more detailed cross section view related with FIGS. 11A to 11C.

FIG. 12A illustrates a more detailed cross section view related to FIGS. 11A to 11C, and more specifically to FIG. 11B, of the dampening mechanism 120 and adjacent disks 12 and 14. Dampening mechanism 120 includes first dampening surface 122 separated from first disk surface 12-1 of disk 12 by essentially air layer Gap 1 as shown in FIGS. 11A to 11C.

Note that in FIG. 11A, the first disk surface 12-1 is the bottom disk surface of disk 12. In FIGS. 11B and 11C, the first disk surface 12-2 is the bottom disk surface of disk 12.

Dampening mechanism 120 may further include a second dampening surface 124 separated from a second disk surface 14-1, in this case, of a second disk 14 by essentially air layer Gap 2, as shown in FIGS. 11C and 12A.

Each of these gaps is at most a first distance, which is preferably less than 1 mm. Each of these gaps is preferably greater than 0.3 mm. It is further preferred that each of these gaps be between 0.35 and 0.6 mm.

One or more of these gaps may preferably be less than the boundary layer thickness. In certain embodiments, one or more of these gaps may preferably be less than a fraction of the boundary layer thickness.

Some inventors describe the dampening of disk 12 vibrations by an elasto-acoustic coupling effect between an elastic-vibration wave field of disk 12 and an acoustic pressure wave field of the adjacent air medium in the gap separating the first disk surface 12-1 and first dampening surface 122. These inventors define the elasto-acoustic coupling effect as a coupling generated between the elastic-vibration wave field of disk 12 and the acoustic pressure wave field in the gap between first disk surface 12-1 and first dampening surface 122.

Experimental results by these inventors point to the acoustic-pressure wave of the air layer gap providing a strong damping force to the elastic-vibration wave of disk 12.

These inventors additionally describe the dampening of disk 14 vibrations by a similar elasto-acoustic coupling effect between an elastic-vibration wave field of disk 14 and an acoustic pressure wave field of the adjacent air medium in the gap separating the second disk surface 14-1 and second dampening surface 124.

Table 2 below illustrates the conditions relating to various Figures involving simulations or experiments.

| FIG. Number | Disk Material (Thickness) | Disk Size (Number of Platters) | Rotation Rate in RPM Tracks Per Inch (TPI) | Gap(s) Mms | Radial Width(s) Inches (mm) | Coverage angle(s) in degrees |
|---|---|---|---|---|---|---|
| 3 (prior art) | A1 (1.27 mm) | 3.5 in 2 | 7200 RPM Not relevant | Not relevant | Not relevant | Not relevant |
| 4 (prior art) | Al (1.27 mm) | 3.5 in 2 | 7200 RPM (57,000 TPI) | Not relevant | Not relevant | Not relevant |
| 10A | Al (1.27 mm) | 3.5 in 3 | 7200 RPM Not relevant | 0.6 mm | 1 in (25 mm) | 180 |
| 10B | Al (1.27 mm) | 3.5 in 3 | 7200 RPM Not relevant | 0.6 mm | 1 in (25 mm) | 180 |
| 12B | Theoretical Lumped Mass Model | Arbitrary Arbitrary | Any RPM Not relevant | See FIG. | Arbitrary | Arbitrary |
| 12C | Theoretical Lumped Mass Model | Arbitrary Arbitrary | Any RPM Not relevant | See FIG. | Arbitrary | Arbitrary |
| 13A | Al (1.27 mm) | 3.5 in 2 | 7200 | 0.5 mm | ⅔ in (17 mm) | 180 |
| 13B | Al (1.27 mm) | 3.5 in 2 | 7200 | 0.5 mm | ⅔ in (17 mm) | 180 |
| 14 | Al (1.27 mm) | 3.5 in 2 | 7200 | 0.5 mm | ⅔ in (17 mm) | 180 |
| 15A | Al (1.27 mm) | 3.5 in 2 | 7200 RPM Not relevant | 0.6 mm | 1 in (25 mm) | 200 |
| 15B | Al (1.27 mm) | 3.5 in 2 | 7200 RPM Not relevant | 0.6 mm | 1 in (25 mm) | 200 |

-continued

| FIG. Number | Disk Material (Thickness) | Disk Size (Number of Platters) | Rotation Rate in RPM Tracks Per Inch (TPI) | Gap(s) Mms | Radial Width(s) Inches (mm) | Coverage angle(s) in degrees |
|---|---|---|---|---|---|---|
| 16A | Al (1.27 mm) | 3.5 in 2 | 7200 and 5400 RPM Not relevant | 0.2–1.8 mm | 1 in (25 mm) | 200 |
| 16B | Al (1.27 mm) | 3.5 in 2 | 7200 and 5400 RPM Not relevant | 0.2–1.8 mm | 1 in (25 mm) | 200 |
| 17 | Al (1.27 mm) | 3.5 in 2 | 7200 RPM (57,000 TPI) | 0.5 mm | 0 and 1 in (25 mm) | 200 |
| 18 | Al (1.27 mm) | 3.5 in 2 | 7200 RPM (57,000 TPI) | 0.5 mm | 0 and 1 in (25 mm) | 200 |
| 19 | Al (1.27 mm) | 3.5 in 2 | 7200 RPM (57,000 TPI) | 0.5 mm | 0 to 1 in (25 mm) | 200 |
| 20 | Al (1.27 mm) | 3.5 in 2 | 7200 RPM (57,000 TPI) | 0.5 mm | 0 to 1 in (25 mm) | 200 |
| 21 | Al (1.27 mm) | 3.5 in 2 | 7200 RPM (57,000 TPI) | 0.5 mm | 1 in (25 mm) | 0–200 |

Figure 12B:
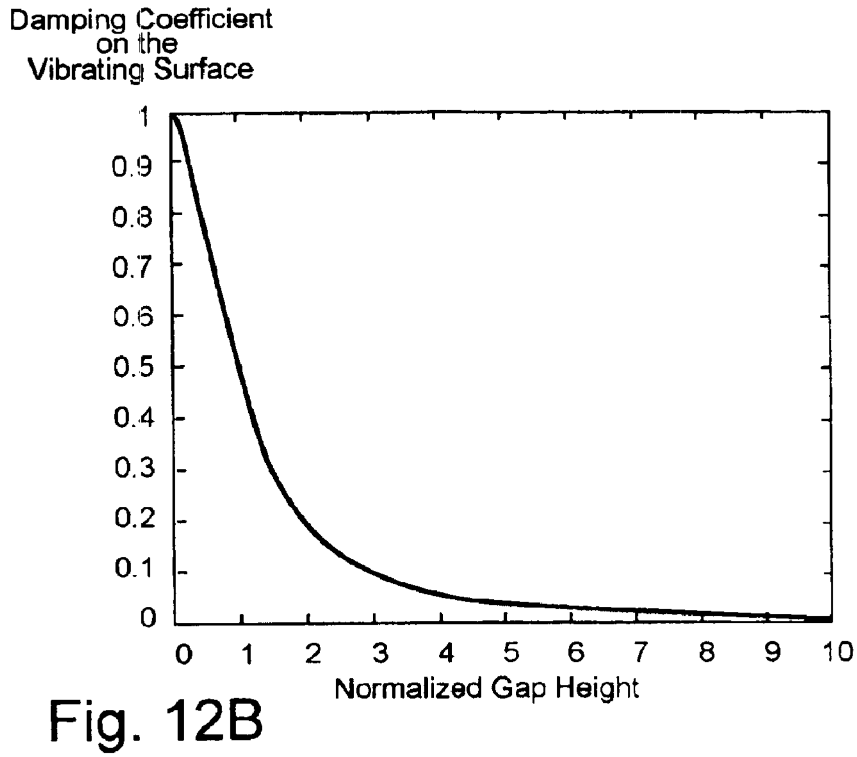
FIG. 12B illustrates theoretical results of the elasto-acoustic coupling effect regarding the damping coefficient of a vibrating disk surface 12 with regards to a normalized gap height Gap 1 of FIG. 12A.

FIG. 12B illustrates theoretical results of the elasto-acoustic coupling effect regarding the damping coefficient of a vibrating disk surface 12 with regards to a normalized gap height Gap 1 of FIG. 12A.

The normalized gap height is in dimensionless units corresponding to a range roughly from 0 to 10. The damping coefficient is defined as used in theoretical vibration theory. In viscous damping, the damping force is proportional to the velocity of the vibrating body. The viscous damping coefficient c is expressed by $c=-F/v$ where F is damping force and v is the velocity of the vibrating body. The negative sign indicates that the damping force is opposite to the direction of velocity of vibrating body.

Figure 12C:
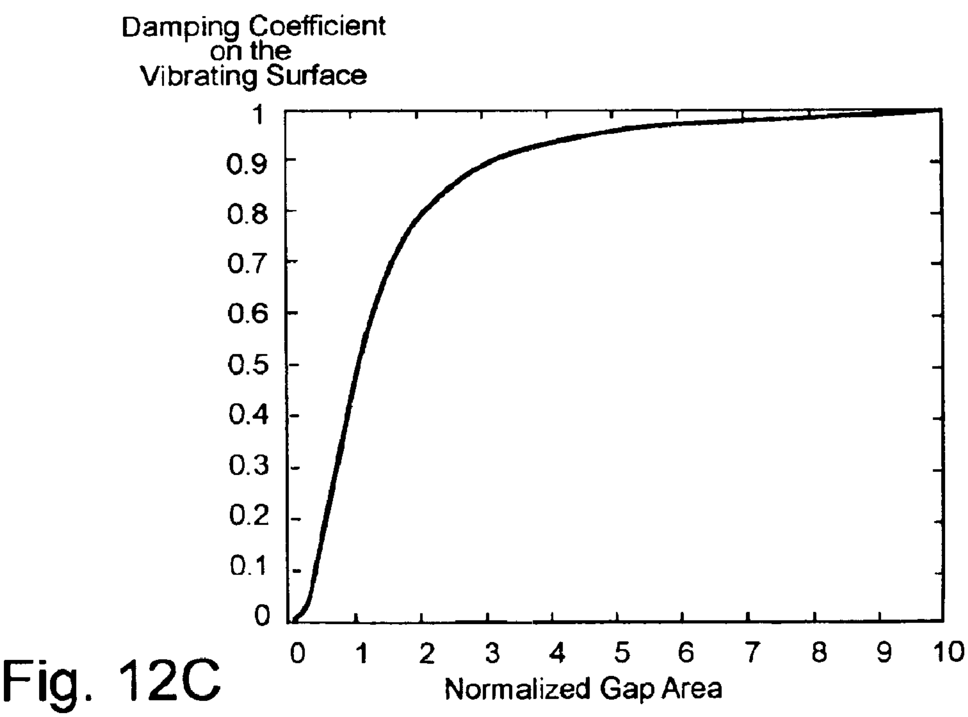
FIG. 12C illustrates theoretical results of the elasto-acoustic coupling effect regarding the damping coefficient of a vibrating disk surface 12 with regards to the normalized first dampening surface 122 of FIG. 12A.

FIG. 12C illustrates theoretical results of the elasto-acoustic coupling effect regarding the damping coefficient of a vibrating disk surface 12 with regards to the normalized first dampening surface 122 of FIG. 12A. The horizontal axis shows the ratio of dampening surface 122 area to disk surface 12 area multiplied by a factor of ten, which is best seen in the top views of FIGS. 7 and 9.

Figure 13A:
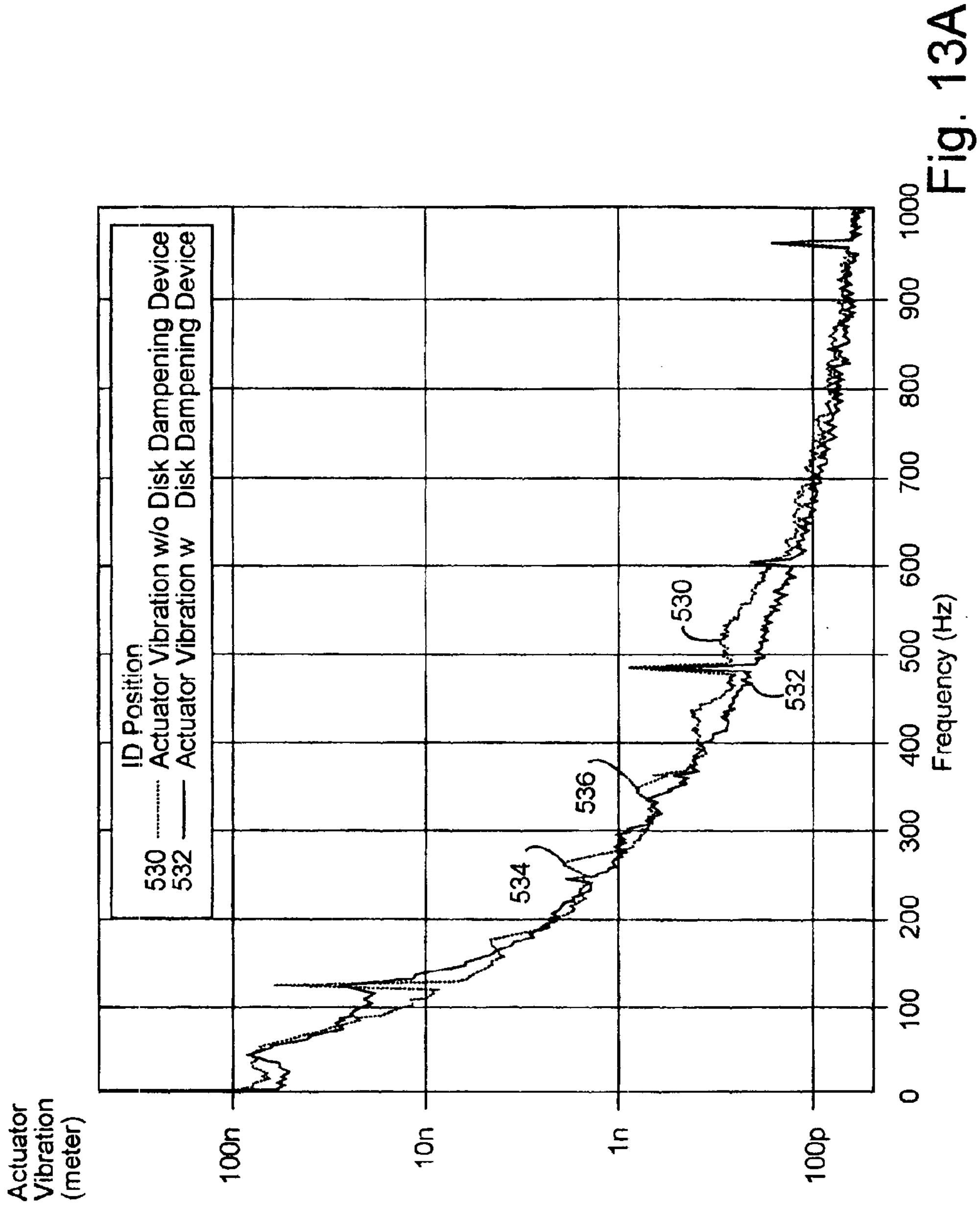
FIGS. 13A, 13B, and 14 illustrate the experimentally determined actuator vibration spectrum from 0 to 1K Hz at the inside diameter, middle diameter and outside diameter, respectively.
Figure 13B:
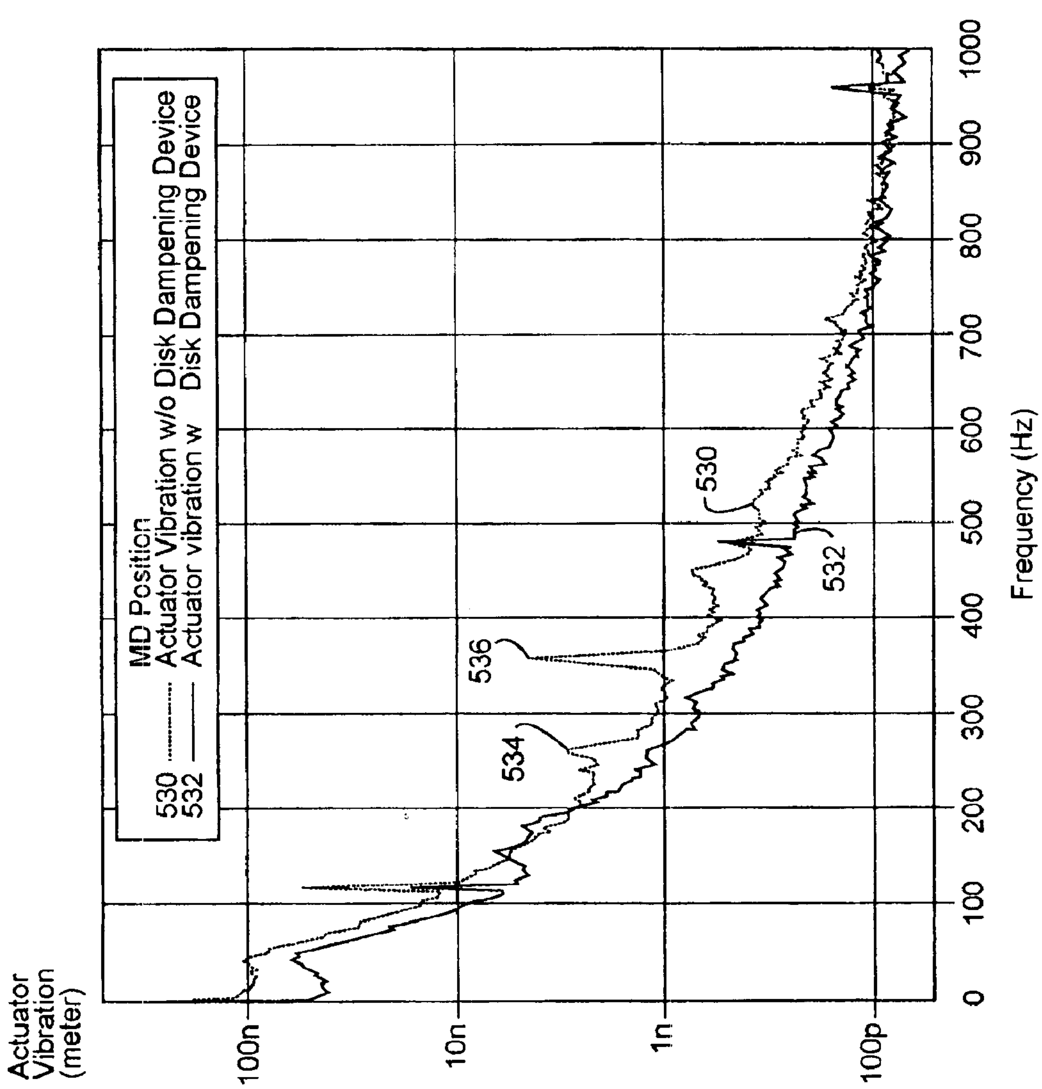
Figure 14:
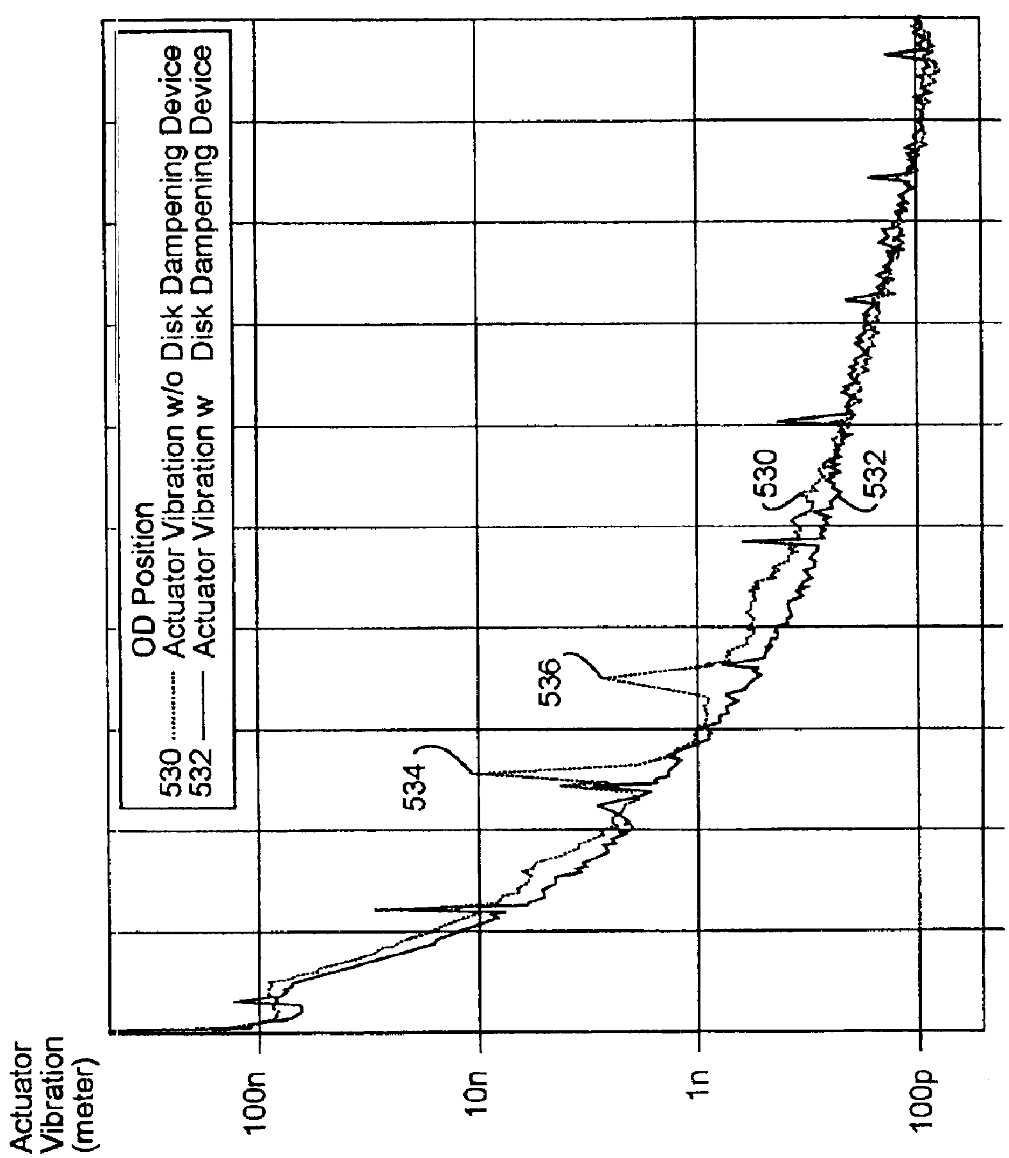

FIGS. 13A, 13B, and 14 illustrate the experimentally determined actuator vibration spectrum from 0 to 1K Hz at the inside diameter, middle diameter and outside diameter, respectively obtained using laser Doppler vibrometer readings taken of an actuator operating in a 3.5 inch disk drive rotating two platters at 7200 RPM. The actuator was a fully assembled actuator including suspension mechanism, head-gimbal assembly and four channel read-write heads.

Traces 530 and 532 illustrate actuator vibration through the frequency range respectively without and with dampening mechanism 120. Dampening mechanism 120 is a plate as illustrated in FIGS. 7, 8 and 11C, positioned within a gap of 0.5 mm from the respective disk surfaces of the two disks 12 and 14. The plate has a radial width of two thirds of an inch, or about 17 mm.

Peak 534 is a vortex-sound induced actuator resonance at approximately 258 Hz in trace 530, which is almost completely eliminated in trace 532. Peak 536 is a vortex-sound induced actuator resonance at approximately 346 Hz in trace 530, which is almost completely eliminated in trace 532. The removal of these resonance peaks is advantageous to the overall track positioning capability of the actuator with regards to the disk surfaces.

Figure 15A:
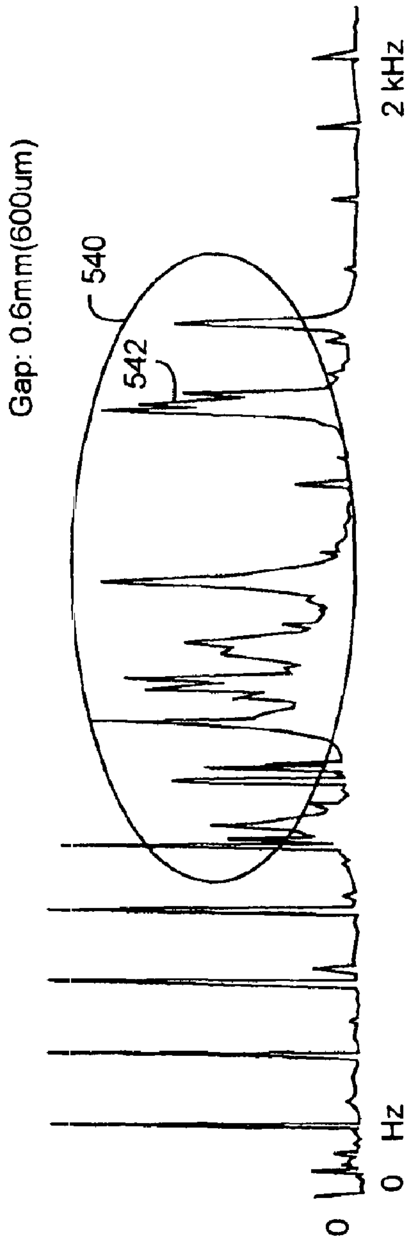
FIGS. 15A and 15B illustrate experimental results of the elasto-acoustic coupling effect regarding the power spectrum of a vibrating disk surface 12 with regards to Gap 1 of FIG. 12A being 0.6 mm and 0.2 mm, respectively.
Figure 15B:
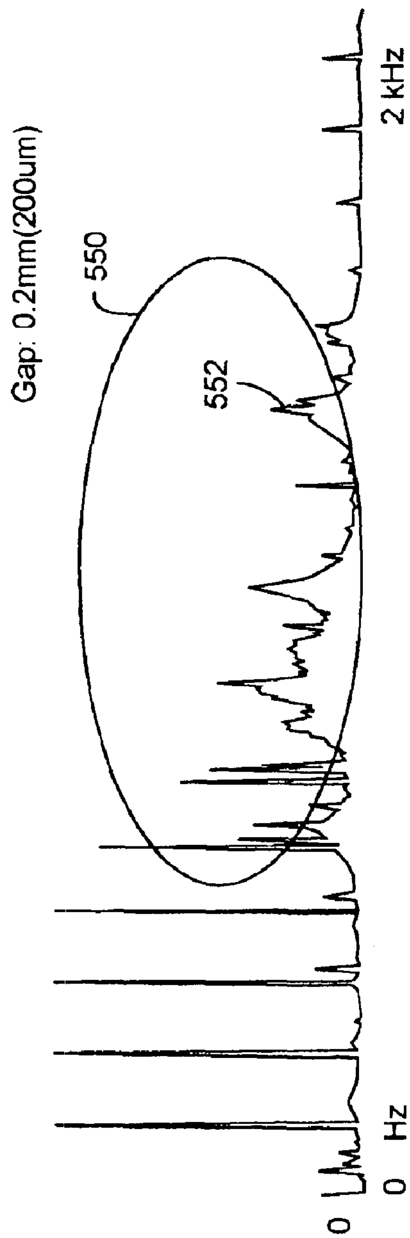

FIGS. 15A and 15B illustrate experimental results of the elasto-acoustic coupling effect regarding the power spectrum of a vibrating disk surface 12 with regards to Gap 1 of FIG. 12A being 0.6 mm and 0.2 mm, respectively. The vertical axis indicates displacement of the outside diameter as measured in meters on a logarithmic scale from 100 pico-meters to 100 nano-meters.

Peaks in regions 540 and 550 are considered by the inventors to be attributable to disk vibration. Peak 542 at a gap of 0.6 mm reduces to peak 552 when the gap decreases to 0.2 mm.

Figure 16A:
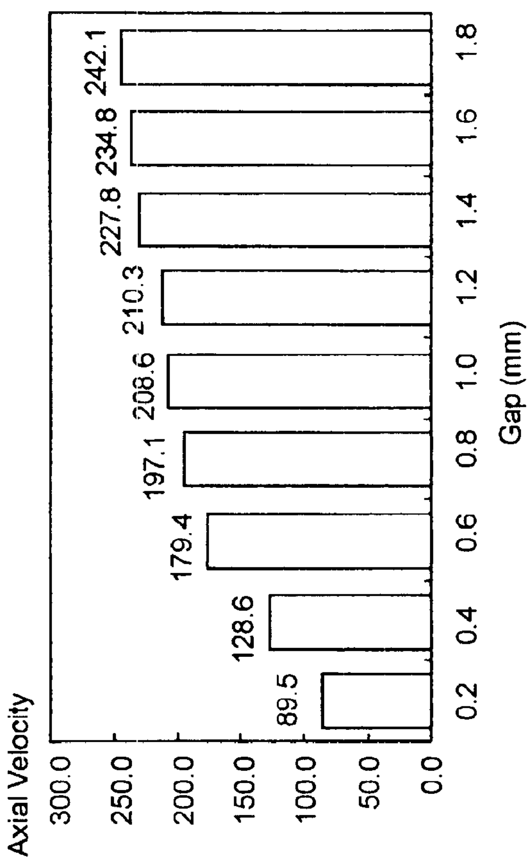
FIGS. 16A and 16B illustrate experimental results of the elasto-acoustic coupling effect regarding the power spectrum of a vibrating disk surface 12 with regards to various values Gap 1 of FIG. 12A for disk rotational speeds of 7200 and 5400 revolutions per minute, respectively.
Figure 16B:
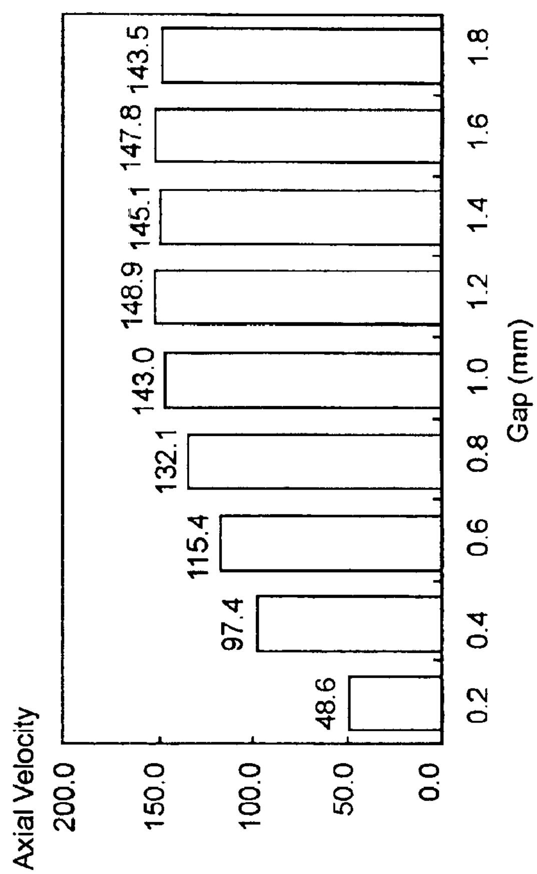

FIGS. 16A and 16B illustrate experimental results of the elasto-acoustic coupling effect regarding the power spectrum of a vibrating disk surface 12 with regards to various values Gap 1 of FIG. 12A for disk rotational speeds of 7200 and 5400 revolutions per minute, respectively. The reported vibration data are the measured axial disk vibration made at the outside diameter of the top disk as measured by a laser Doppler velocity meter.

Figure 17:
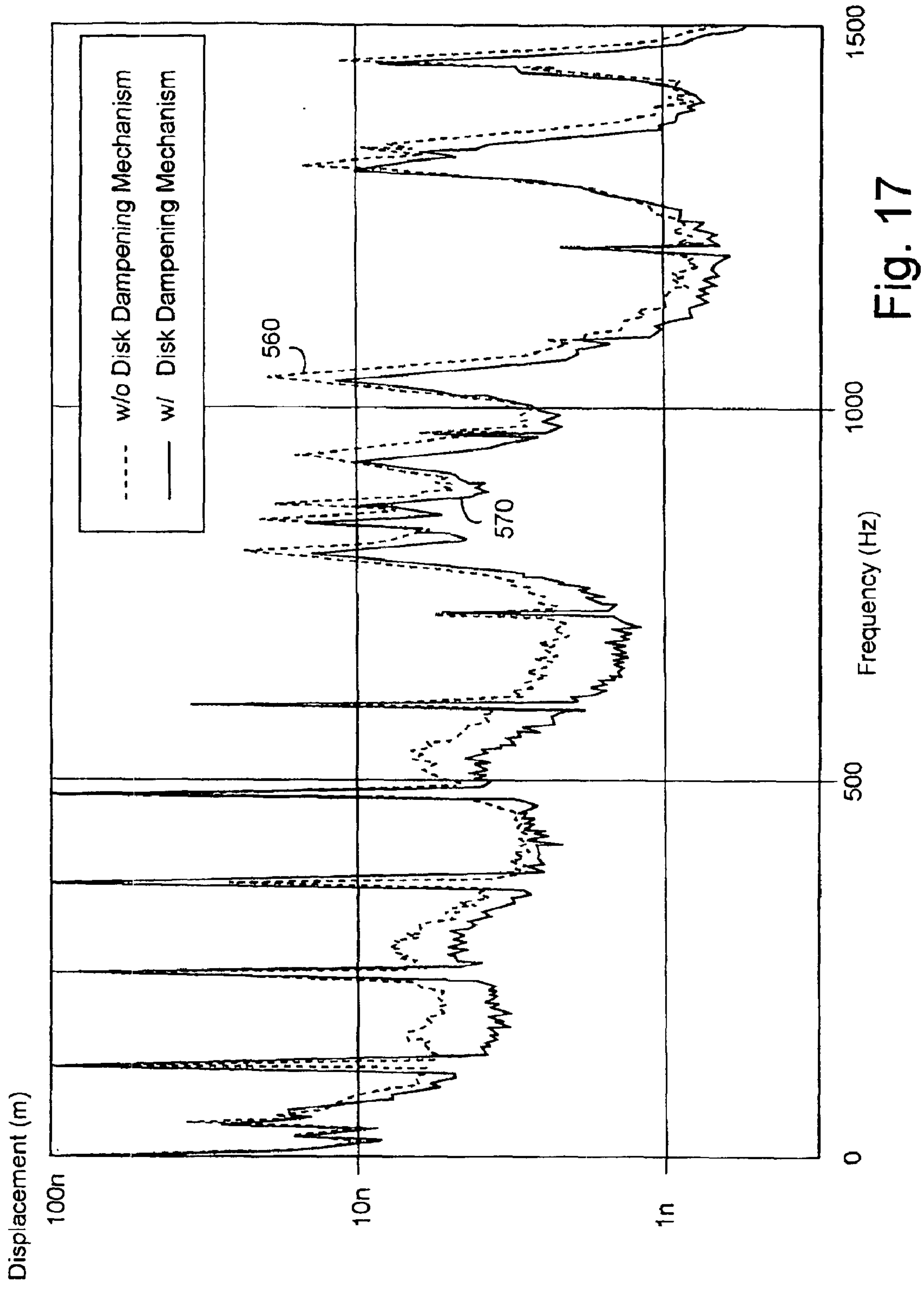
FIG. 17 illustrates experimental results of the elasto-acoustic coupling effect regarding the displacement frequency spectrum of vibrating disk surface 12, both with a dampening mechanism of 25 mm radial width 570 and without a dampening mechanism 560.

FIG. 17 illustrates experimental results of the elasto-acoustic coupling effect regarding the displacement frequency spectrum of vibrating disk surface 12, both with a dampening mechanism of 25 mm radial width 570 and without a dampening mechanism 560.

Figure 18:
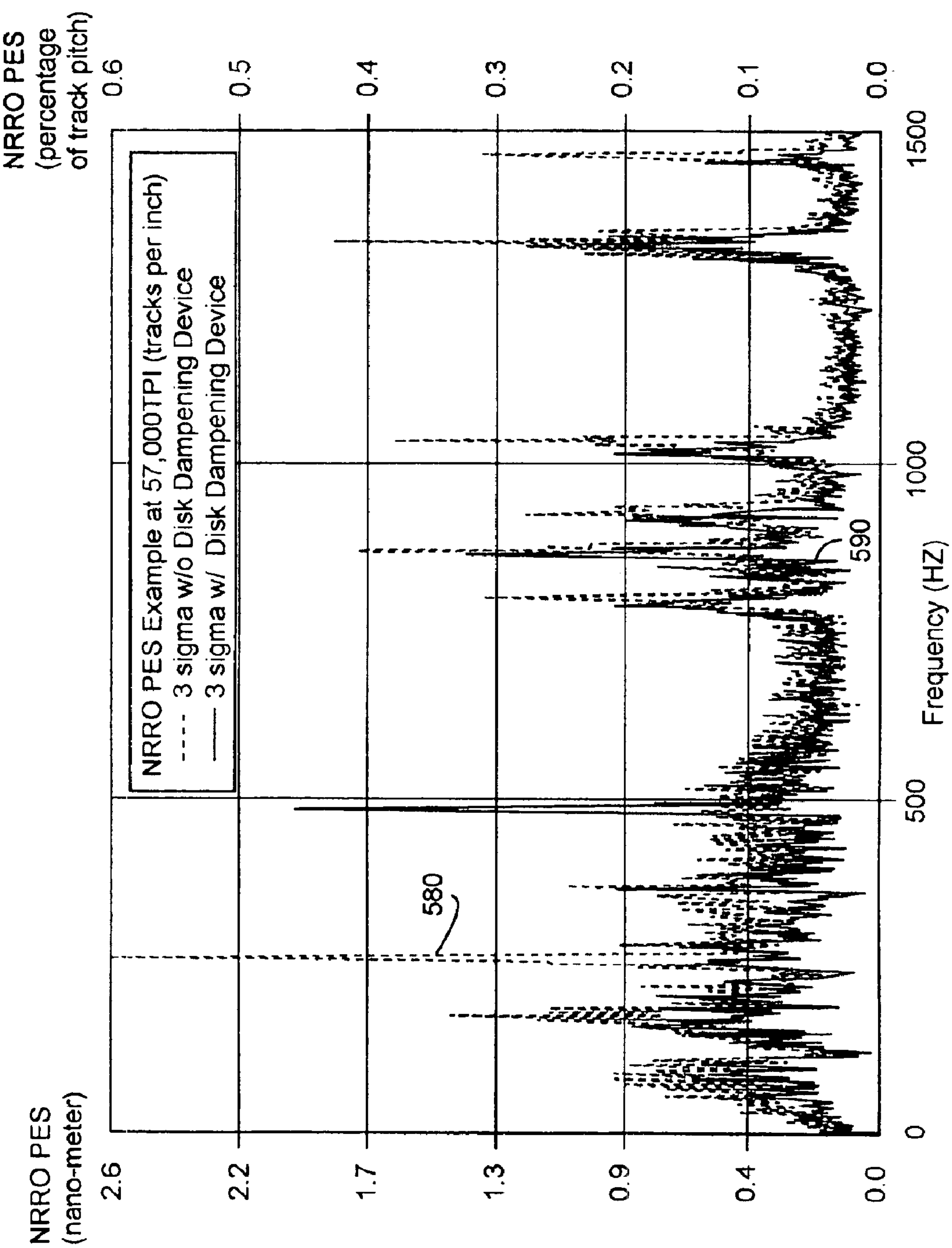
FIG. 18 illustrates head Position Error Signal (PES) spectrum experimentally determined as a Non-Repeatable Run Out (NRRO) PES spectrum in a conventional 57,000 Track-Per-Inch (TPI) disk drive system 580 and in a disk system employing a 25 mm dampening mechanism 590 providing a 30% reduction in PES.

FIG. 18 illustrates head Position Error Signal (PES) spectrum experimentally determined as a Non-Repeatable Run Out (NRRO) PES spectrum in a conventional 57,000 Track-Per-Inch (TPI) disk drive system 580 and in a disk system employing a 25 mm dampening mechanism 590 providing a 30% reduction in PES.

The left axis indicates NRRO PES in nano-meters. The right axis equivalently indicates NRRO PES percentage of track pitch. Trace 580 indicates readings within three standard deviations for PES of roughly 36 nano-meters or equivalently, 7 percent track pitch.

Trace 590 indicates readings within three standard deviations for PES of roughly 24 nano-meter or equivalently, 4.7 percent of track pitch.

Figure 19:
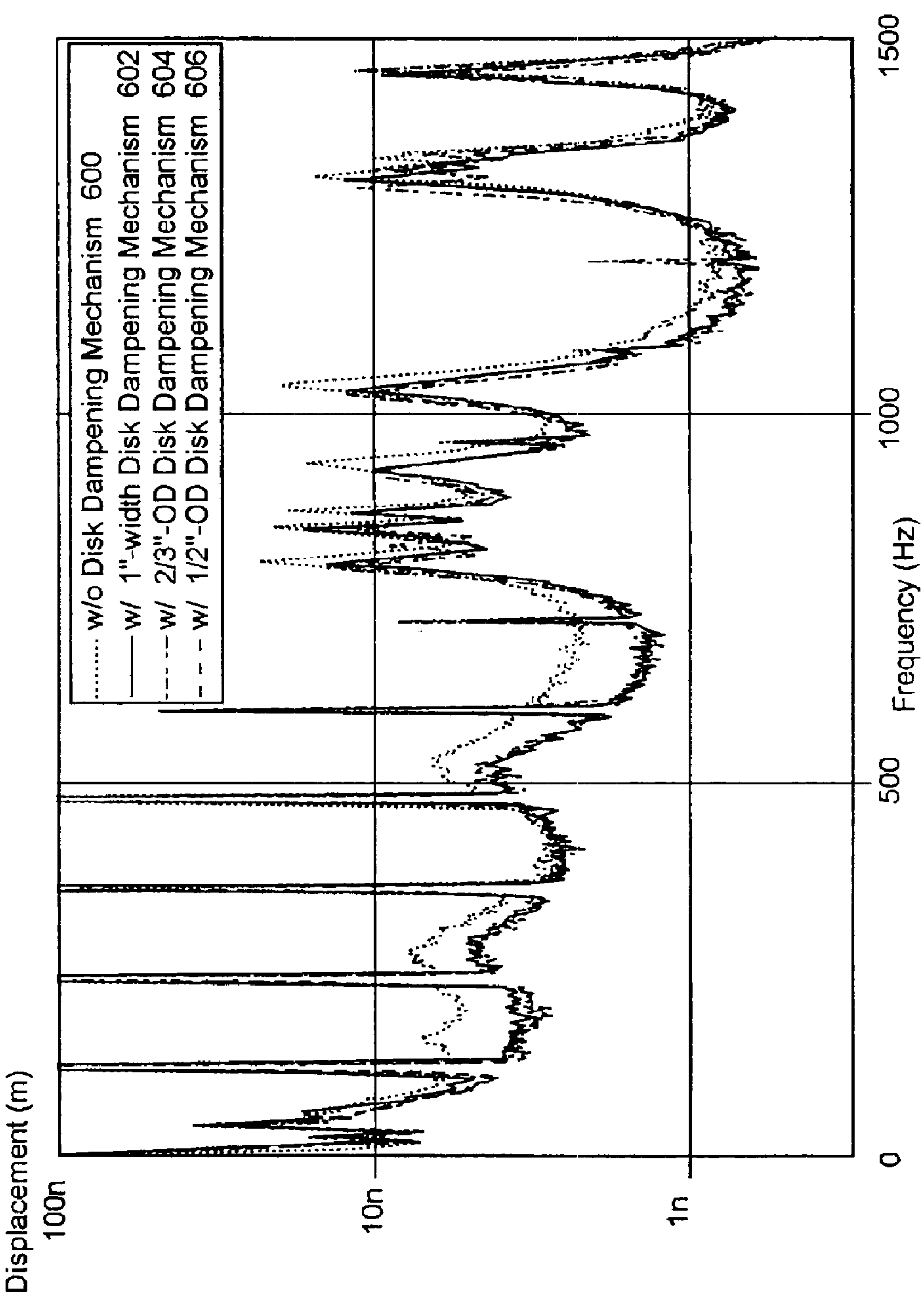
FIG. 19 illustrates head Position Error Signal (PES) spectrum experimentally determined as a Non-Repeatable Run Out (NRRO) PES spectrum in a conventional 57,000 Track-Per-Inch (TPI) disk drive system 600 and in a disk system employing dampening mechanism with varying radial widths.

FIG. 19 illustrates head Position Error Signal (PES) spectrum experimentally determined as a Non-Repeatable Run Out (NRRO) PES spectrum in a conventional 57,000 Track-Per-Inch (TPI) disk drive system 600 and in a disk system employing dampening mechanism with varying radial widths.

Results from dampening mechanisms 120 of 25, 17 and 12.5 mm radial width are indicated by traces 602, 604, and 606, respectively.

Figure 20:
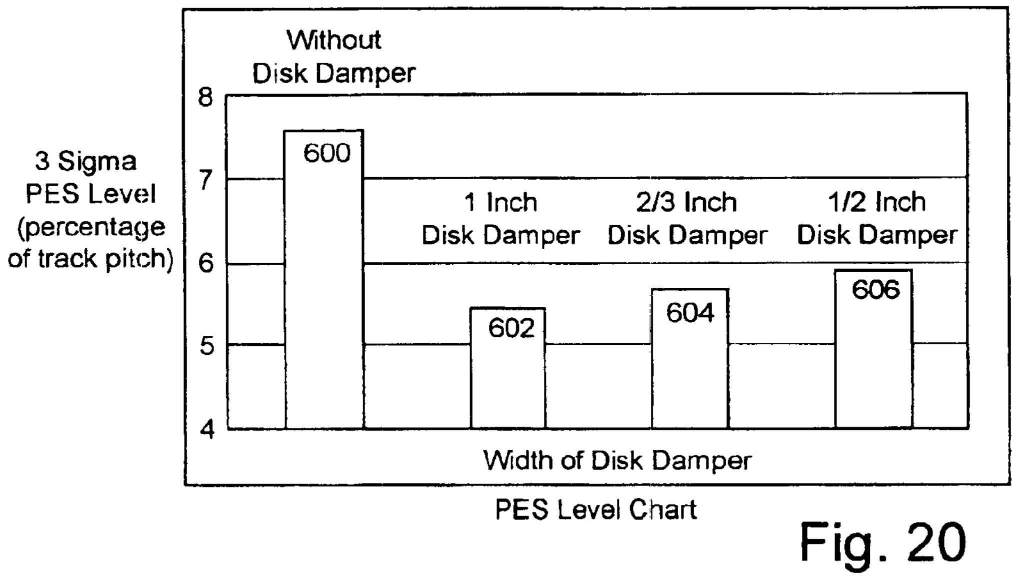
FIG. 20 illustrates head Position Error Signal (PES) levels experimentally determined in a conventional 57,000 Track-Per-Inch (TPI) disk drive system 600 and in a disk drive employing dampening mechanism with varying radial widths.

FIG. 20 illustrates head Position Error Signal (PES) levels experimentally determined in a conventional 57,000 Track-Per-Inch (TPI) disk drive system 600 and in a disk drive employing dampening mechanism with varying radial widths.

In the experiments illustrated by FIGS. 19 and 20, the pitch of one data track is 0.44 micrometers. The vertical axis indicates the PES level at three standard deviations. Box 600 indicates the experimental results when no dampening mechanism is used. Boxes 602, 604, and 606 indicate the experimental results when dampening mechanisms of one inch, two-thirds inch and one half inch in radial width, respectively, are used. Dampening mechanism 120 was a plate as illustrated in FIG. 23E.

The experimental results indicate that the 25 mm radial width dampening mechanism has the lowest PES level, supporting the hypothesis that the wide-width dampening mechanism reduces the PES more than the narrow-width dampening mechanism.

Figure 21:
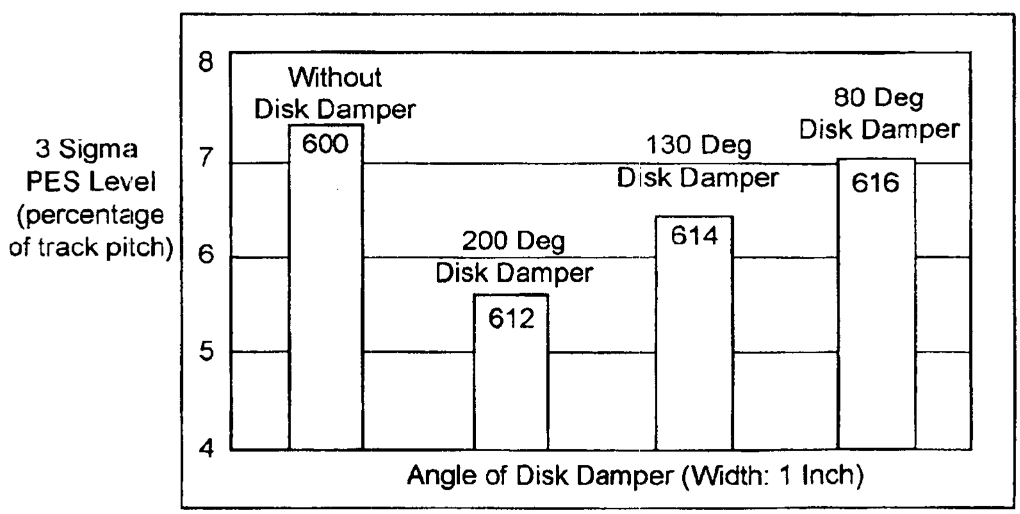
FIG. 21 illustrates head Position Error Signal (PES) levels experimentally determined in a conventional 57,000 Track-Per-Inch (TPI) disk drive system 600 and in a disk system employing dampening mechanism with varying coverage angles and radial width of one inch or 25 mms.

FIG. 21 illustrates head Position Error Signal (PES) levels experimentally determined in a conventional 57,000 Track-Per-Inch (TPI) disk drive system 600 and in a disk system employing dampening mechanism with varying coverage angles and radial width of one inch or 25 mms.

In these experiments, the pitch of one data track is 0.44 micrometers. The vertical axis indicates the PES level at three standard deviations. Box 600 indicates the experimental results when no dampening mechanism is used. Boxes 612, 614, and 616, indicate experimental results when a dampening mechanism with a coverage angle of 200, 130, and 80 degrees, respectively are used.

The experimental results illustrated in FIG. 21 support the hypothesis that wide-angle dampening mechanisms reduce PES more than narrow-angle dampening mechanisms.

Figure 22:
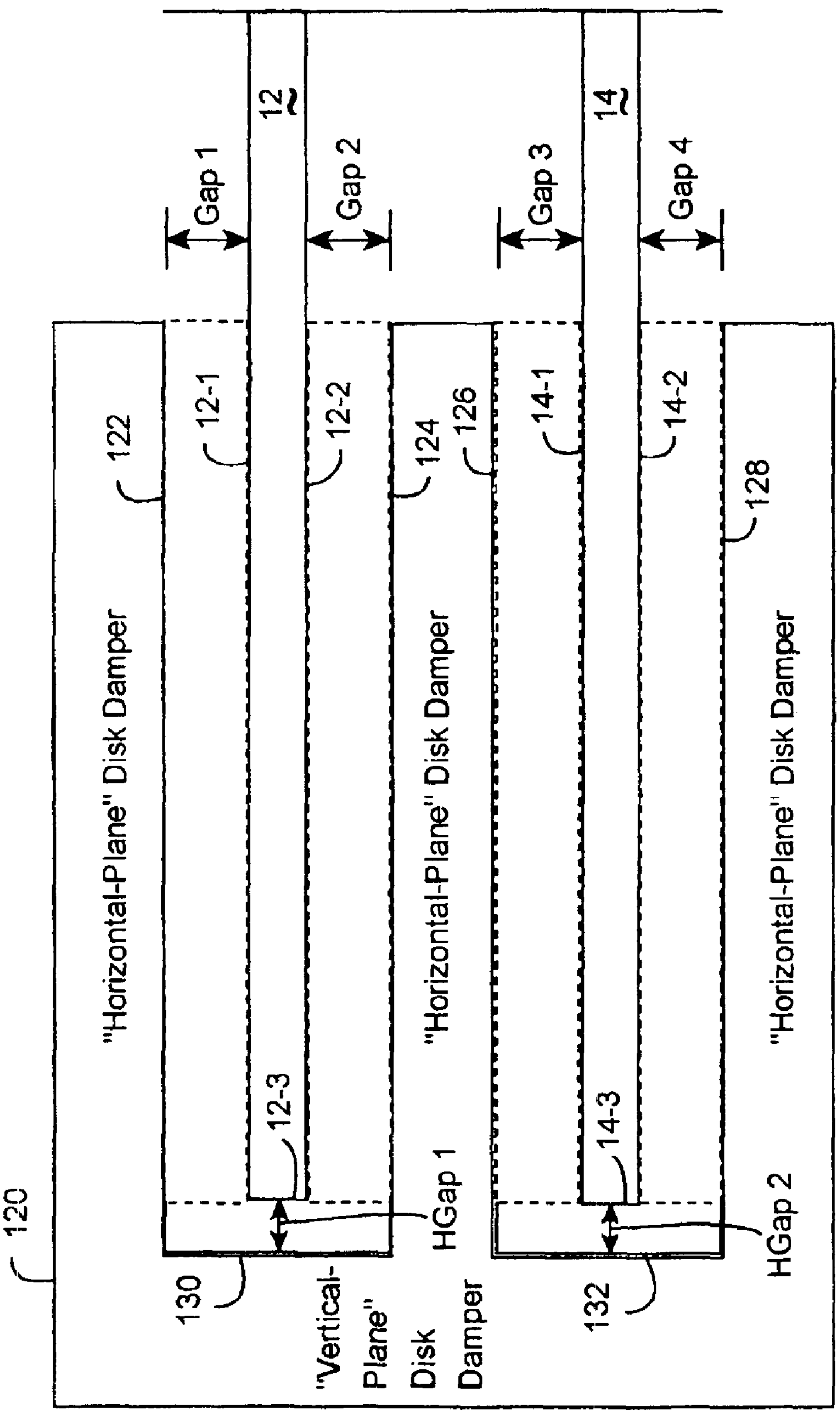
FIG. 22 illustrates an extension of the material and analyses of FIGS. 2A and 12A for further preferred embodiments of the invention.

FIG. 22 illustrates an extension of the material and analyses of FIGS. 2A and 12A for further preferred embodiments of the invention.

As in FIGS. 11A and 12A, dampening mechanism 120 includes first dampening surface 122 separated from first disk surface 12-1 of disk 12 by essentially air layer Gap 1 as shown in FIGS. 11A to 11C. Dampening mechanism 120 further includes a second dampening surface 124 separated from a second disk surface 12-2, in this case, of first disk 12 by essentially air layer Gap 2.

Dampening mechanism 120 includes a "vertical-plane" disk damper containing a first vertical surface 130 separated from an outer edge 12-3 of disk 12 by essentially HGap 1. The horizontal gap between first vertical surface 130 and the outer edge of disk 12 creates an enclosing disk-edge wave field in the air medium, further contributing to stabilizing the disk 12.

As in FIG. 12A, each of these Gaps 1–4 is at most a first distance, which is preferably less than 1 mm. Each of the gaps is further preferably greater than 0.3 mm. Each of the gaps is further preferred between 0.35 mm and 0.6 mm.

One or more of these gaps may preferably be less than the boundary layer thickness. In certain embodiments, one or more of these gaps may preferably be less than a fraction of the boundary layer thickness.

The invention contemplates using the disk cover 110 to provide at least first dampening surface 122 as part of the dampening mechanism 120 and also using disk cover 110 to further provide first vertical surface 130.

FIG. 22 further illustrates dampening mechanism 120 including a third dampening surface 126 separated from a third disk surface 14-1 belonging to a second disk 14 by essentially a third gap, Gap 3.

Dampening mechanism 120 may also include the "vertical-plane" disk damper containing a second vertical surface 132 separated from the outer edge 14-3 of disk 14 by essentially HGap 2. The horizontal gap between second vertical surface 132 and outer edge 14-3 of disk 14 create an enclosing disk-edge wave field in the air medium, further contributing to stabilizing the disk 14.

Dampening mechanism 120 may also include a fourth dampening surface 128 separated from a fourth disk surface 14-2 by a fourth gap, Gap 4.

Each of the horizontal gaps is at most a second distance, which is preferably less than 1 mm. Each of the gaps is further preferably greater than 0.3 mm. Each of the gaps is further preferred between 0.35 mm and 0.6 mm. One or more of these horizontal gaps may preferably be less than the boundary layer thickness. In certain embodiments, one or more of these horizontal gaps may preferably be less than a fraction of the boundary layer thickness.

The invention also contemplates using the disk base 100 to provide at least fourth dampening surface 128 as part of the dampening mechanism 120 and also using disk base 100 to further provide second vertical surface 132.

FIGS. 23A–23E illustrate various shapes, edges, and materials for a plate used in dampening mechanism 120 of the previous FIGS. The plate may be composed of at least one member of a non-outgassing hard plastic and a metal alloy. The metal alloy may contains a majority of aluminum, copper and iron. The plate may be primarily composed of an aluminum alloy. The plate may further have a coating disposed thereon for inhibiting outgassing of the aluminum alloy. When the plate is composed primarily of said non-outgassing hard plastic, the plate may further include a non-outgassing polycarbonate.

Note that boundaries 140–146 are only indicated in FIG. 23E to simplify the other Figures and is not meant to limit the scope of the claims.

Figure 23A:
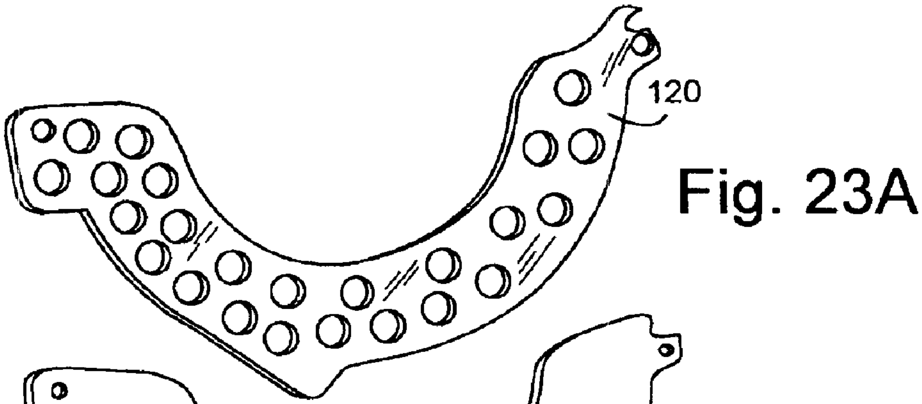
FIGS. 23A–23E illustrate various shapes, edges, and materials for a plate used in dampening mechanism 120 of the previous Figures.
Figure 23B:
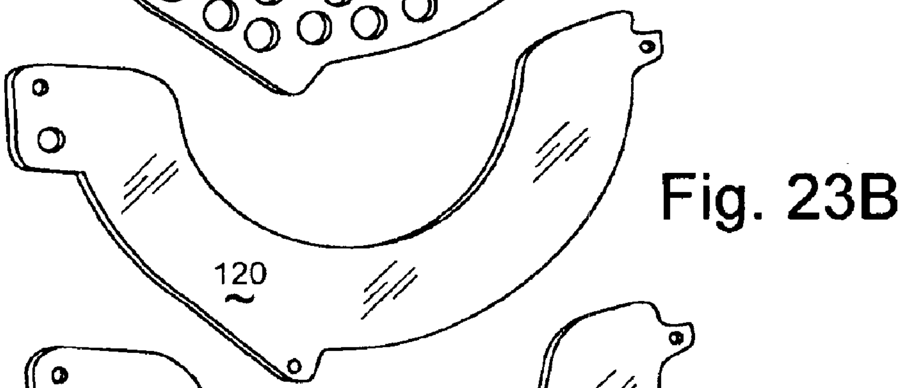
Figure 23C:
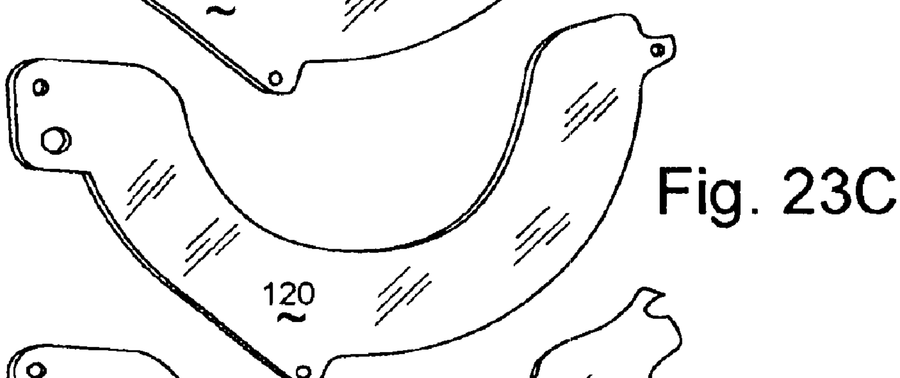
Figure 23D:
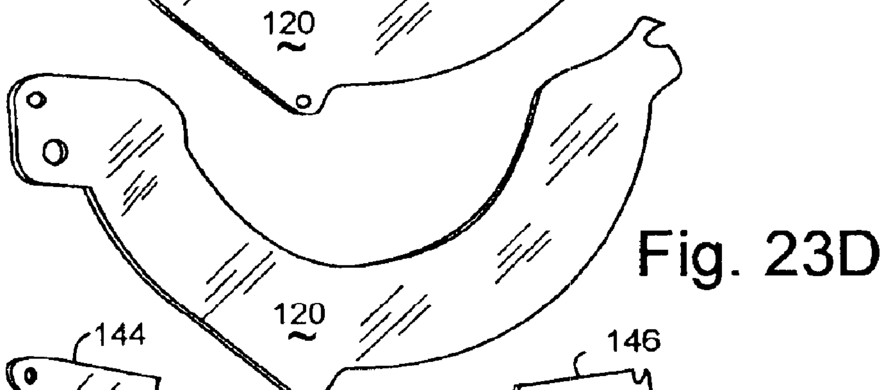
Figure 23E:
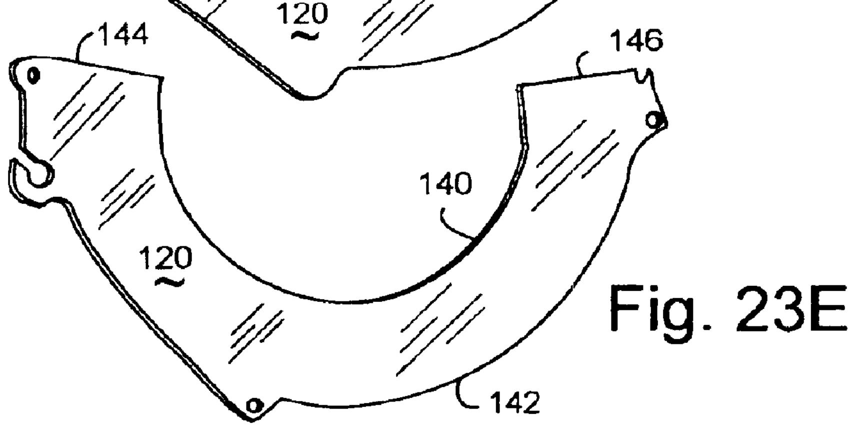

FIG. 23A illustrates an aluminum plate 120 including a sharp step edge on boundaries 140, 144 and 146 with perforations. The perforations are preferably about 5 mm is diameter to optimally reduce actuator vibration. FIG. 23B illustrates a hard plastic, preferably a polycorbonate material such as LEXAN®, plate 120 including a wedge type edge on boundaries 140, 144 and 146. FIG. 23C illustrates a hard plastic plate 120 including a sharp step edge on boundaries 140, 144 and 146. FIG. 23D illustrates an aluminum plate 120 including a round chamfer edge on boundaries 140, 144 and 146.

FIG. 23E illustrates an aluminum plate 120 including a sharp step edge on boundaries 140, 144 and 146. In embodiments using an aluminum plate, the plates may preferably include a coating of Aluminum Plus on one or more surfaces.

The invention further contemplates plates such as illustrated in FIGS. 23A–23E further including fingers formed to disrupt formation of vortices in the neighborhood of the actuator and its components.

The disk drive system employing dampening mechanisms 120 as illustrated in the previous Figures also benefits from reduced noise levels. Table 3 below illustrates experiments conducted upon several disk drives employing two disks rotating at 7200 revolutions per minute. The experiments used a preferred dampening mechanism 120 illustrated in FIG. 23D with a Gap of 0.5 mm, radial width of ⅔ in, or 17 mm, and a coverage angle of 200 deg.

TABLE 3

| Drive No. | Acoustic Noise with no dampening mechanism (Sound power level: dB) | Acoustic noise with dampening mechanism (Sound Power Level: dB) |
|---|---|---|
| 1 | 27.8 | 25.6 |
| 2 | 28.3 | 26.1 |
| 3 | 28.6 | 26.1 |
| 4 | 28.4 | 26.1 |
| 5 | 26.9 | 24.9 |
| Average value | 28.0 | 25.8 |
| Average Reduction | 2.2 | |

The preceding embodiments have been provided by way of example and are not meant to constrain the scope of the following claims.

What is claimed is:

1. A disk drive, comprising:

a plurality of disks, a first of said disks including a first disk surface and a second of said disks including a second disk surface;

a disk base;

an actuator providing a read-write head assembly communicatively coupled to said first disk surface and a second read-write head assembly communicatively coupled to said second disk surface, said actuator pivotably coupled to said disk base;

a spindle motor rigidly coupled to said disk base, said spindle motor provided to rotate said disks about an axis of rotation at an operating rotational velocity;

a dampening mechanism including a plate fixedly attached to said disk base and further including a first dampening surface separated from said first disk surface by essentially a first gap for at least 175 degrees with respect to said axis of rotation of said disks and for at least 16 millimeters of radial width with respect to said axis of rotation of said disks;

said dampening mechanism further including, a second dampening surface separated from said second disk surface by essentially a second gap for at least 175 degrees with respect to said axis of rotation of said disks and for at least 16 millimeters of radial width with respect to said axis of rotation of said disks, wherein each member of a gap collection comprising said first gap and said second gap is at most a fixed distance; wherein said fixed distance is at most one millimeter;

said dampening mechanism reducing aerodynamic forces acting upon said first disk surface and said second disk surface to stabilize said disk surfaces as said first and said second disk surfaces rotate at said disk operating rotational velocity; and said dampening mechanism reducing aerodynamic forces acting upon said actuator as said first and said second disk surfaces rotate at said disk operating rotational velocity; and a disk cover attached to said disk base forming an enclosure containing said spindle motor, said plurality of disks, said actuator, and said dampening mechanism.

2. The disk drive of claim 1 wherein said operating rotational velocity is at least 5400 revolutions per minute.

3. The disk drive of claim 2 wherein said operating rotational velocity is greater than 5400 revolutions per minute.

4. The disk drive of claim 1 wherein rotation of said disks at said operating rotational velocity creates a boundary layer thickness from said first disk surface and wherein said fixed distance is about said boundary layer thickness.

5. The disk drive of claim 4 wherein said fixed distance is less than said boundary layer thickness.

6. The disk drive of claim 1 wherein said plate is composed of at least one member of a collection comprising a non-outgassing hard plastic and a metal alloy; wherein said metal alloy contains a majority of a member of the collection of aluminum, copper, and iron.

7. The disk drive of claim 6 wherein said plate is composed primarily of an aluminum alloy.

8. The disk drive of claim 7 wherein said plate has a coating disposed thereon for inhibiting outgassing of said aluminum alloy.

9. The disk drive of claim 6 wherein said plate is composed primarily of said non-outgassing hard plastic further comprising a non-outgassing polycarbonate.

10. The disk drive of claim 1, wherein a member of said disk plurality includes a third disk surface;

wherein said dampening mechanism further includes a third dampening surface separated from said third disk surface by essentially a third gap; and wherein said gap collection is further comprised of said third gap.

11. The disk drive of claim 10, wherein a member of said disk plurality includes a fourth disk surface;

wherein said dampening mechanism further includes a fourth dampening surface separated from said fourth disk surface by essentially a fourth gap; and wherein said gap collection is further comprised of said fourth gap.

12. The disk drive of claim 1 wherein said disk plurality is further comprised of a third of said disks.

13. The disk drive of claim 1, wherein a cross section of said first dampening surface parallel to a rotational plane of said disks contains a truncated annulus including an inner circular boundary and an outer circular boundary; and wherein said inner circular boundary and said outer circular boundary are both centered near said axis of rotation of said disks.

14. The disk drive of claim 13, wherein said cross section of said first dampening surface parallel to said rotational plane is said truncated annulus.

15. The disk drive of claim 13, wherein an inner boundary of said cross section of said first dampening surface parallel to said rotational plane varies from said inner circular boundary.

16. The disk drive of claim 13, wherein an outer boundary of said cross section of said first dampening surface parallel to said rotational plane varies from said outer circular boundary.

17. The disk drive of claim 1, wherein said first dampening surface is connected.

18. The disk drive of claim 17, wherein said first dampening surface is simply connected.

19. The disk drive of claim 17, wherein said connected first dampening surface contains at least one perforation.

20. The disk drive of claim 19, wherein a diameter of said perforation is between one millimeter and six millimeters.

21. The disk drive of claim 1 wherein said plate contains an inner boundary facing said spindle motor.

22. The disk drive of claim 21, wherein said inner boundary contains a rounded edge; and wherein said rounded edge approximates at least one member of the collection comprising a circular rounding, an elliptical rounding, a beveled rounding, a chamfered rounding, and a knife edge rounding.

23. The disk drive of claim 1, wherein each gap collection member is at least 0.35 millimeters.

24. The disk drive of claim 23, wherein said fixed distance is at most 0.6 millimeters; and wherein each of said gap collection members is at least 0.35 millimeters.

25. A disk drive, comprising:

a first disk including a first disk surface and a second disk surface;

a disk base;

an actuator providing a read-write head assembly communicatively coupled to said first disk surface and a second read-write head assembly communicatively coupled to said second disk surface, said actuator pivotably coupled to said disk base;

a spindle motor rigidly coupled to said disk base, said spindle motor provided to rotate said first disk about an axis of rotation at an operating rotational velocity;

a dampening mechanism including a plate fixedly attached to said disk base and further including a first dampening surface separated from said first disk surface by essentially a first gap for at least 175 degrees with respect to said axis of rotation of said disks and for at least 16 millimeters of radial width with respect to said axis of rotation of said disks;

said dampening mechanism further including, a second dampening surface separated from said second disk surface by essentially a second gap for at least 175 degrees with respect to said axis of rotation of said disks and for at least 16 millimeters of radial width with respect to said axis of rotation of said disks, wherein each member of a gap collection comprising said first gap and said second gap is at most a fixed distance; wherein said fixed distance is at most one millimeter;

said dampening mechanism reducing aerodynamic forces acting upon said first disk surface and said second disk surface to stabilize said disk surfaces as said first and said second disk surfaces rotate at said disk operating rotational velocity; and said dampening mechanism reducing aerodynamic forces acting upon said actuator as said first and said second disk surfaces rotate at said disk operating rotational velocity; and a disk cover attached to said disk base forming an enclosure containing said spindle motor, said first disk, said actuator, and said dampening mechanism.

26. A disk drive, comprising:

at least one disk including a first disk surface;

at least one actuator providing a read-write head assembly communicatively coupled to said first disk surface;

means for rotating said at least one disk at an operating rotational velocity; and means for dampening said actuator with respect to said first disk surface, said dampening means including, means for providing a first dampening surface separated from said first disk surface by essentially a first gap;

means for reducing aerodynamic forces acting upon said first disk surface of said at least one disk for stabilizing said least one disk as said at least one disk rotates at said operating rotational velocity; and means for reducing aerodynamic forces acting upon said actuator as said at least one disk rotates at said operating rotational velocity;

wherein each member of a gap collection is at most a fixed distance, said gap collection comprising said first gap; wherein said fixed distance is at most one millimeter.

27. The disk drive of claim 26 wherein said operating rotational velocity is at least 5400 revolutions per minute.

28. The disk drive of claim 26, wherein rotation of said disks at said operating rotational velocity creates a boundary layer thickness from said first disk surface; and wherein said fixed distance is about said boundary layer thickness.

29. The disk drive of claim 28, wherein said fixed distance is less than said boundary layer thickness.

30. The disk drive of claim 26, further comprising:

said actuator providing a second read-write head assembly communicatively coupled to a second disk surface.

31. The disk drive of claim 30, where said dampening means further includes a second dampening surface separated from said second disk surface by essentially a second gap; and wherein said gap collection is further comprised of said second gap.

32. The disk drive of claim 31 wherein said first disk includes said second disk surface.

33. The disk drive of claim 26 wherein said first dampening surface is separated from said first disk surface by essentially said first gap for at least 175 degrees with respect to said axis of rotation of said disks.

34. The disk drive of claim 26 wherein said first dampening surface is separated from said first disk surface by essentially said first gap for at least 16 millimeters in width from an axis of rotation of said disks.

35. The disk drive of claim 26, wherein each of said gap collection members is at least 0.35 millimeters.

36. A method of reducing tracking positioning errors for a disk drive, comprising the steps of:

rotating at least one disk including at least a first disk surface at an operating rotational velocity relative to at least one actuator providing a read-write head assembly communicatively coupled near said first disk surface; and dampening said actuator with respect to said first disk surface, said dampening step including the steps of, providing a first dampening surface separated from said first disk surface by essentially a first gap;

reducing aerodynamic forces acting upon said actuator based upon air flow related to said disk operating rotational velocity and related to said gap collection members; and reducing aerodynamic forces acting upon said first disk surface for stabilizing said first disk surface based upon air flow related to said disk operating rotational velocity and related to said gap collection members;

wherein each member of a gap collection is at most a fixed distance, said gap collection comprising said first gap; and wherein said fixed distance is at most one millimeter.

37. The method of claim 36 wherein said operating rotational velocity is at least 5400 revolutions per minute.

38. The method of claim 36, wherein each of said gap collection members is at least 0.35 millimeters.

39. The method of claim 36 wherein said first dampening surface is separated from said first disk surface by essentially said first gap for at least 175 degrees with respect to an axis of rotation of said disks.

40. The method of claim 36 wherein said first dampening surface is separated from said first disk surface by essentially said first gap for at least 16 millimeters in width from an axis of rotation of said disks.

41. A disk drive, comprising:

at least one disk including a first disk surface;

at least one actuator providing a read-write head assembly communicatively coupled near said first disk surface; and a dampening mechanism providing a first dampening surface separated from said first disk surface by essentially a first gap;

wherein said least one disk rotates at an operating rotational velocity relative to said dampening mechanism and to said actuator;

wherein each member of a gap collection is at most a fixed distance; wherein said fixed distance is at most one millimeter;

wherein said disk drive is further comprised of:

said dampening mechanism reducing aerodynamic forces acting upon said actuator based upon air flow related to said disk operating rotational velocity and related to said gap collection members; and said dampening mechanism stabilizing said first disk based upon air flow related to said disk operating rotational velocity and related to said gap collection members; and wherein said gap collection is comprised of said first gap.

42. The disk drive of claim 41 wherein said operating rotational velocity is at least 5400 revolutions per minute.

43. The disk drive of claim 41 wherein said first dampening surface is separated from said first disk surface by essentially said first gap for at least 180 degrees with respect to said axis of rotation of said disks.

44. The disk drive of claim 41 wherein said first dampening surface is separated from said first disk surface by essentially said first gap for at least 200 degrees with respect to said axis of rotation of said disks.

45. The disk drive of claim 41 wherein said first dampening surface is separated from said first disk surface by essentially said first gap for at least 16 millimeters in width from an axis of rotation of said disks.

46. The disk drive of claim 41, further comprising:

a disk base;

a spindle motor rigidly coupled to said disk base, said spindle motor provided to rotate said disks about an axis of rotation at said operating rotational velocity; and a disk cover attached to said disk base forming an enclosure containing said spindle motor, said at least one disk, said actuator, and said dampening mechanism.

47. The disk drive of claim 46 wherein said dampening mechanism reduces acoustic noise at a boundary of said enclosure.

48. The disk drive of claim 41, wherein each of said gap collection members is at least 0.35 millimeters.

49. A method of using a dampening mechanism to reduce track positioning errors for a disk drive, comprising the steps of:

said dampening mechanism reducing aerodynamic forces acting upon a first disk surface, included in said disk drive, to stabilize said first disk surface as said first disk surface rotates at a disk operating rotational velocity; and said dampening mechanism reducing aerodynamic forces acting upon a second disk surface, included in said disk drive, to stabilize said second disk surface as said second disk surface rotates at said disk operating rotational velocity;

wherein said dampening mechanism includes:

a plate fixedly attached to a disk base, included in said disk drive, and further including a first dampening surface separated from said first disk surface by essentially a first gap;

a second dampening surface separated from said second disk surface by essentially a second gap, wherein each of said first gap and said second gap is at most a fixed distance; wherein said fixed distance is at most one millimeter;

wherein a gap collection includes said first gap and said second gap.

50. The method of claim 49, wherein said operating rotational velocity is at least 5400 revolutions per minute.

51. The method of claim 50, wherein said operating rotational velocity is greater than 5400 revolutions per minute.

52. The method of claim 49, wherein rotation of said first disk surface at said operating rotational velocity creates a boundary layer thickness from said first disk surface and wherein said fixed distance is about said boundary layer thickness.

53. The method of claim 52, wherein said fixed distance is less than said boundary layer thickness.

54. The method of claim 49, wherein said disk drive includes a first disk; and wherein said first disk includes said first disk surface and said second disk surface.

55. The method claim 49, wherein said disk drive includes a first disk and a second disk; wherein said first disk includes said first disk surface, and said second disk includes said second disk surface.

56. The method of claim 49, further comprising the step of:

said dampening mechanism reducing aerodynamic forces acting upon a third disk surface, included in said disk drive, to stabilize said third disk surface as said third disk surface rotates at said disk operating rotational velocity.

57. The method of claim 56, wherein said dampening mechanism includes a third dampening surface separated from said third disk surface by essentially a third gap; and said third gap is included in said gap collection.

58. The method of claim 49, wherein said disk drive includes a first disk, a second disk and a third disk.

59. The method of claim 49, further comprising the step of:

said dampening mechanism reducing aerodynamic forces acting upon an actuator included in said disk drive as said first and said second disk surfaces rotate at said disk operating rotational velocity.

* * * * *